United States Patent [19]

Lindsey et al.

[11] Patent Number: 5,463,594
[45] Date of Patent: Oct. 31, 1995

[54] HIGH FREQUENCY RETENTION SEISMIC SURVEY METHOD

[76] Inventors: Joe P. Lindsey, 314 Lakeway Dr., Coldspring, Tex. 77331; James R. Patch, 7058 Sharpcrest, Houston, Tex. 77074

[21] Appl. No.: 110,504

[22] Filed: Aug. 20, 1993

Related U.S. Application Data

[63] Continuation-in-part of Ser. No. 980,661, Nov. 24, 1992, abandoned.

[51] Int. Cl.$^6$ .................................................. G01V 1/36
[52] U.S. Cl. .................................. 367/38; 367/59
[58] Field of Search ............................ 367/56, 58, 38, 367/48, 49, 59, 60, 63; 181/112; 364/421

[56] References Cited

U.S. PATENT DOCUMENTS

| | | | |
|---|---|---|---|
| 2,018,737 | 10/1935 | Owen | 367/59 |
| 2,684,468 | 7/1954 | McClure et al. | 333/173 |
| 2,732,906 | 1/1956 | Mayne | 367/59 |
| 2,740,489 | 4/1956 | White et al. | 181/112 |
| 2,991,447 | 7/1961 | Winterhalter et al. | 367/50 |
| 3,212,599 | 10/1965 | Johnsen | 367/50 |
| 3,278,893 | 10/1966 | Silverman | 367/59 |
| 3,286,783 | 11/1966 | Chery, Jr. et al. | 181/112 |
| 3,539,982 | 11/1970 | Hileman et al. | 367/50 |
| 3,747,056 | 7/1973 | Treybig et al. | 367/62 |
| 4,206,509 | 6/1980 | Ruehle | 367/42 |
| 4,481,612 | 11/1984 | Curran | 367/75 |
| 4,677,598 | 6/1987 | Johnson | 367/56 |
| 4,686,655 | 8/1987 | Hyatt | 367/59 |
| 4,758,998 | 7/1988 | Johnson et al. | 367/58 |
| 4,944,036 | 7/1990 | Hyatt | 367/43 |
| 4,953,657 | 9/1990 | Edington | 181/111 |
| 5,031,717 | 7/1991 | Hardee et al. | 181/106 |
| 5,080,189 | 1/1992 | Cole | 181/106 |

FOREIGN PATENT DOCUMENTS

2090406  7/1992  United Kingdom.

OTHER PUBLICATIONS

Geophysical Prospecting, vol. 25, No. 2 Weighted Vertical Stacking In Crustal Seismic Reflection Studies On The Canadian Shield Jun., 1977 pp. 251–268.

Field Geophysicist, vol. XXVII, No. 6, Pt. 11 Thumping Technique Using Full Spread of Geophones Dec., 1962 pp. 252–265.

Levin Geophysics, vol. 42, No. 5 Vertical Stacking As A Reflection Filter Aug., 1977 pp. 1045–1048.

Gailbraith Geophysics, vol. 33, No. 1 Characteristics of Optimum MultiChannel Stacking Filter Feb., 1968 pp. 36–48.

Lambright Geophysics: The Leading Edge Of Exploration 100% (Single–Fold) VS. CDP (Multifold) With Today's Budgets Dec., 1986 pp. 22–26.

Laster Geophysics, vol. 50, No. 12 The Present State of Seismic Data Acquisition: One View Dec., 1985 pp. 2443–2451.

Macelwane Geophysics, vol. V, No. 3, Part One Fifteen Years Of Geophysics: A Chapter In The Exploration Of The United States And Canada, 1824–1939 Jul., 1940 pp. 1924–1939.

Gardner Geophysics, vol. XII, No. 1 Vertical Velocities From Reflection Shooting Jan., 1947 pp. 221–228.

Dankbaar Geophysical Prospecting, vol. 31, No. 6 The Wavefield Generated By Two Vertical Vibrators In Phase And In Counterphase Dec., 1983 pp. 873–887.

Anstey, N. A., *Field Techniques For High Resolution*, Geophysics: The Leading Edge of Exploration, vol. 5, No. 4, pp. 26–34 (Apr., 1986).

(List continued on next page.)

*Primary Examiner*—Ian J. Lobo

[57] ABSTRACT

Methods for generating seismic data and creating a seismic section are disclosed in which the difference in offsets between stacked traces is limited.

47 Claims, 26 Drawing Sheets

OTHER PUBLICATIONS

Correspondence between Robert L. Coultrip, Steve Foster, and Nigel Anstey, Geophysics: The Leading Edge of Exploration, Vo. 5, No. 6, pp. 8–10 (Jun., 1986).

Published letters by Robert H. Sambell and Howard L. Taylor, Geophysics: The Leading Edge of Exploration, vol. 5, No. 10, pp. 10–11 (Oct., 1986).

*A Reply by Nigel Anstey,* Geophysics: The Leading Edge of Exploration, vol. 5, No. 12, pp. 19–21 (Dec., 1986).

Published letters by M. Ali Ak and Ola Eiken, Geophysics: The Leading Edge of Exploration, vol. vol. 6, No. 7, pp. 28–30 (Jul., 1987).

A Reply by Nigel Anstey to letters of Mr. Ak and Mr. Eiken, *Discussion of the Stack–Array Concept Continues,* Geophysics: The Leading Edge of Exploration, vol. 6, No. 7, pp. 32, 48 (Jul., 1987).

Letter of M. Alik Ak in reply to Anstey's reply, Geophysics: The Leading Edge of Exploration, vol. 7, No. 2, p. 8 (Feb., 1988).

Published letter by William C. Pritchett, Geophysics: The Leading Edge of Exploration, vol. 7, No. 12, p. 8 (Dec., 1988).

Anstey, N. A., *Stack–Array Discussion Continues,* Geophysics: The Leading Edge of Exploration, vol. 8, No. 3, pp. 24–25, 31 (Mar., 1989).

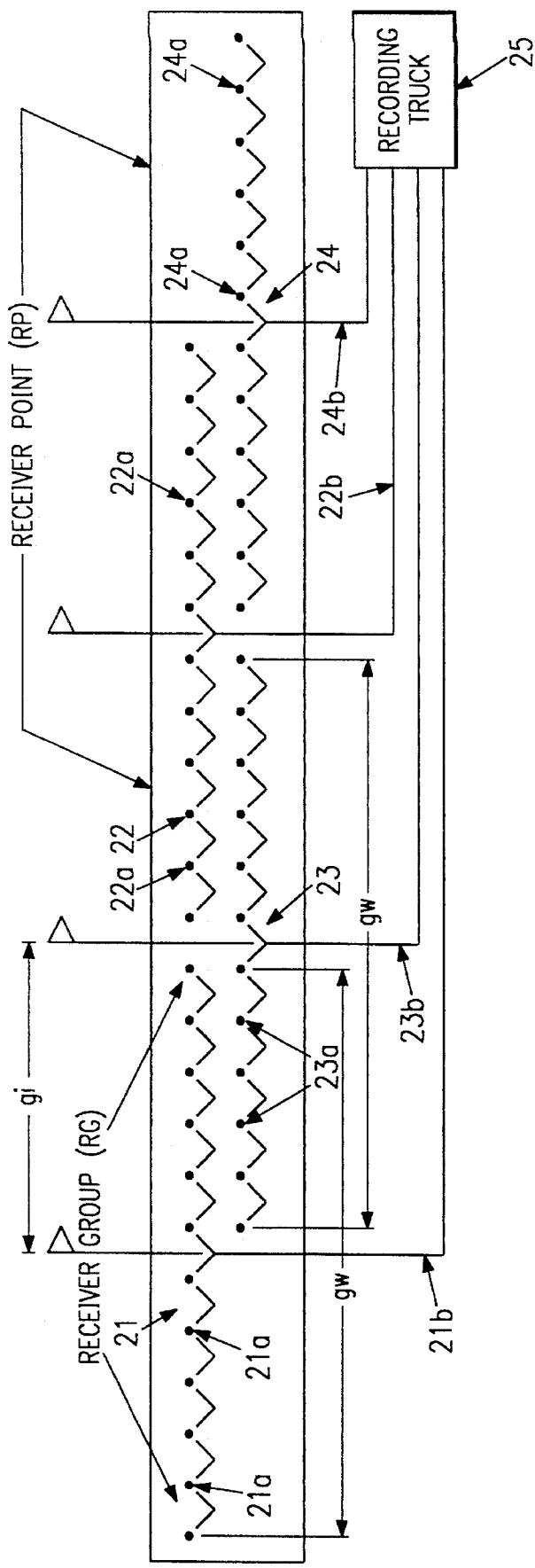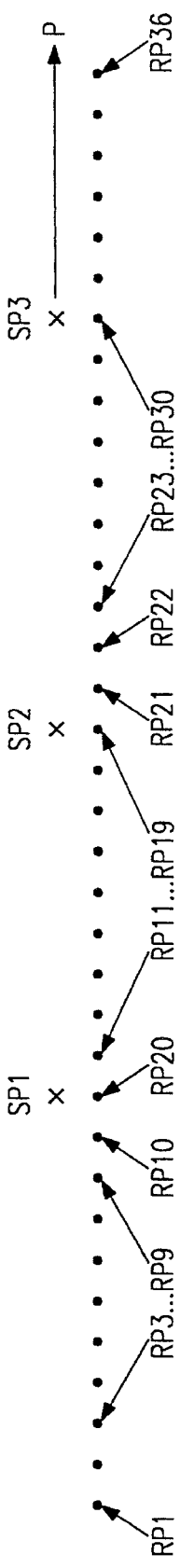
FIG. 2
FIG. 3

| | | |
|---|---|---|
| ta1 — rg1 o | tb1 — rg1 o | tc1 — rg1 o |
| ta2 — rg2 o | tb2 — rg2 o | tc2 — rg2 o |
| ta3 — rg3 o | tb3 — rg3 o | tc3 — rg3 o |
| ta4 — rg4 o | tb4 — rg4 o | tc4 — rg4 o |
| ta5 — rg5 o | tb5 — rg5 o | tc5 — rg5 o |
| ta6 — rg6 o | tb6 — rg6 o | tc6 — rg6 o |
| ta7 — rg7 o | tb7 — rg7 o | tc7 — rg7 o |
| ta8 — rg8 o | tb8 — rg8 o | tc8 — rg8 o |
| ta9 — rg9 o | tb9 — rg9 o | tc9 — rg9 o |
| ta10 — rg10 o | tb10 — rg10 o | tc10 — rg10 o |
| ta11 — rg11 o | tb11 — rg11 o | tc11 — rg11 o |
| ta12 — rg12 o | tb12 — rg12 o | tc12 — rg12 o |
| ta13 — rg13 o | tb13 — rg13 o | tc13 — rg13 o |
| ta14 — rg14 o | tb14 — rg14 o | tc14 — rg14 o |
| ta15 — rg15 o | tb15 — rg15 o | tc15 — rg15 o |
| ta16 — rg16 o | tb16 — rg16 o | tc16 — rg16 o |
| ta17 — rg17 o | tb17 — rg17 o | tc17 — rg17 o |
| ta18 — rg18 o | tb18 — rg18 o | tc18 — rg18 o |
| ta19 — rg19 o | tb19 — rg19 o | tc19 — rg19 o |
| ta20 — rg20 o | tb20 — rg20 o | tc20 — rg20 o |
| ta21 — rg21 o | tb21 — rg21 o | tc21 — rg21 o |
| ta22 — rg22 o | tb22 — rg22 o | tc22 — rg22 o |
| ta23 — rg23 o | tb23 — rg23 o | tc23 — rg23 o |
| ta24 — rg24 o  ]A | tb24 — rg24 o | tc24 — rg24 o |
| ta25 — rg25 o | tb25 — rg25 o  ]B | tc25 — rg25 o |
| ta26 — rg26 o | tb26 — rg26 o | tc26 — rg26 o  ]C |
| ta27 — rg27 o | tb27 — rg27 o | tc27 — rg27 o |
| ta28 — rg28 o | tb28 — rg28 o | tc28 — rg28 o |
| ta29 — rg29 o | tb29 — rg29 o | tc29 — rg29 o |
| ta30 — rg30 o | tb30 — rg30 o | tc30 — rg30 o |
| ta31 — rg31 o | tb31 — rg31 o | tc31 — rg31 o |
| ta32 — rg32 o | tb32 — rg32 o | tc32 — rg32 o |
| ta33 — rg33 o | tb33 — rg33 o | tc33 — rg33 o |
| ta34 — rg34 o | tb34 — rg34 o | tc34 — rg34 o |
| ta35 — rg35 o | tb35 — rg35 o | tc35 — rg35 o |
| ta36 — rg36 o | tb36 — rg36 o | tc36 — rg36 o |
| ta37 — rg37 o | tb37 — rg37 o | tc37 — rg37 o |
| ta38 — rg38 o | tb38 — rg38 o | tc38 — rg38 o |
| ta39 — rg39 o | tb39 — rg39 o | tc39 — rg39 o |
| ta40 — rg40 o | tb40 — rg40 o | tc40 — rg40 o |
| ta41 — rg41 o | tb41 — rg41 o | tc41 — rg41 o |
| ta42 — rg42 o | tb42 — rg42 o | tc42 — rg42 o |
| ta43 — rg43 o | tb43 — rg43 o | tc43 — rg43 o |
| ta44 — rg44 o | tb44 — rg44 o | tc44 — rg44 o |
| ta45 — rg45 o | tb45 — rg45 o | tc45 — rg45 o |
| ta46 — rg46 o | tb46 — rg46 o | tc46 — rg46 o |
| ta47 — rg47 o | tb47 — rg47 o | tc47 — rg47 o |
| ta48 — rg48 o | tb48 — rg48 o | tc48 — rg48 o |
| ta49 — rg49 o | tb49 — rg49 o | tc49 — rg49 o |

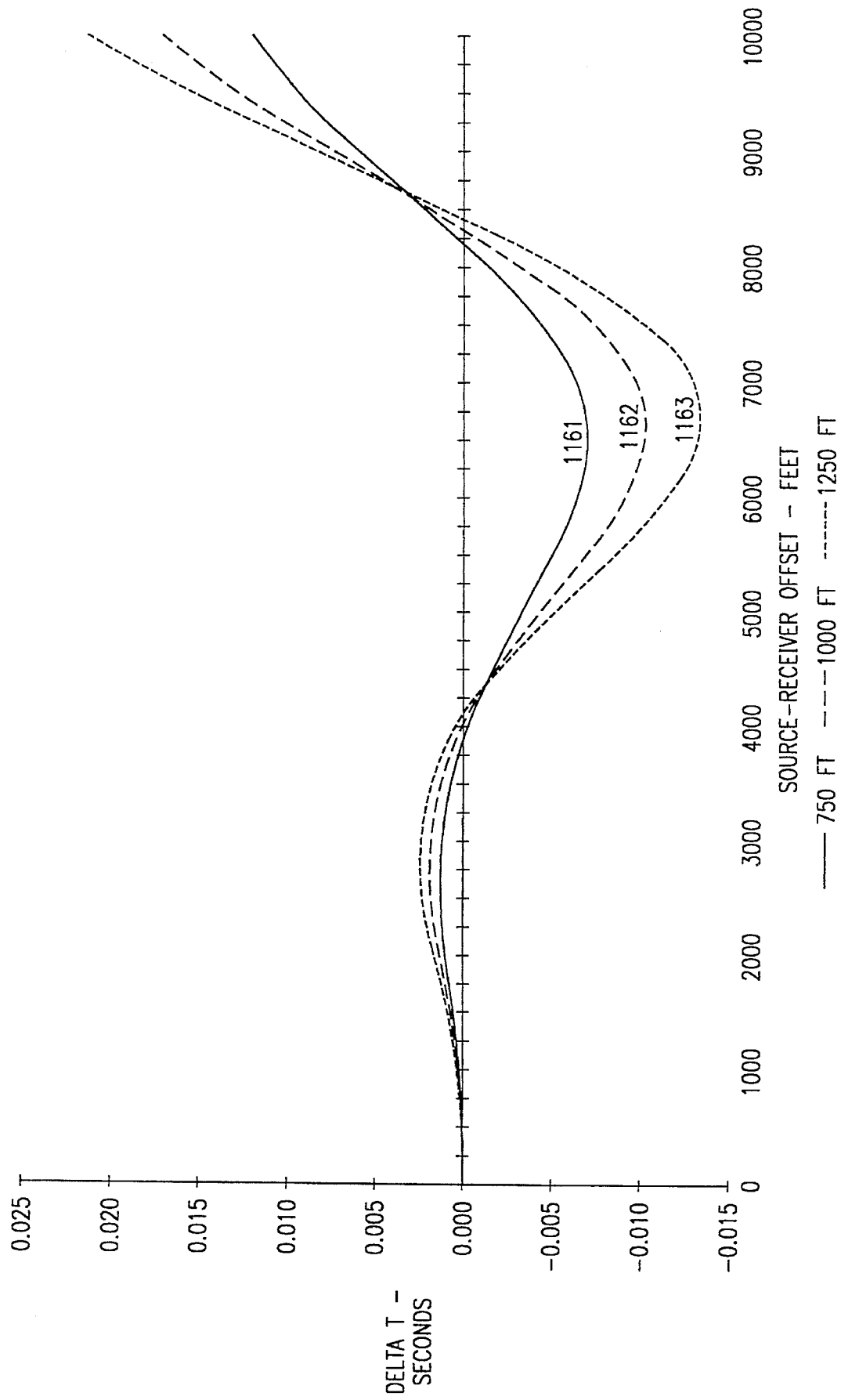

HIGH FREQUENCY RETENTION SEISMIC SURVEY METHOD

RELATED APPLICATIONS

This application is a continuation-in-part of U.S. patent application Ser. No. 07/980,661, filed Nov. 24, 1992 now abandoned.

BACKGROUND OF THE INVENTION

This invention relates to seismic data gathering and the creation of recordings of seismic data commonly known as "seismic sections." More particularly, this invention relates to a new process for simultaneously increasing horizontal and vertical resolution while preserving high frequency response and suppressing horizontal noise in seismic sections. In addition, the present invention allows for Amplitude Variation with Offset ("AVO") analysis and removal of multiple reflections from the section, as well as providing an improved correction for static errors and conducting velocity analysis.

Early Seismic Survey Methods

For many years, the seismic industry has tried to add multiple individual signals from a particular reflection point of interest, on the theory that the summed result would have a higher signal-to-noise ratio than the individual signals, because the noise present in any particular signal is generally random, while the reflection from the point of interest is repeatable.

An example of such a process is called "vertical stacking", generally described in U.S. Pat. No. 2,018,737, issued to Owen on Oct. 29, 1935 and incorporated herein by reference. According to Owen, a plurality of relatively small charges of explosive (an example of a signal source) are successively detonated in the immediate vicinity of each other at a first location (sometimes referred to as a "shot point" or "source point"), while, at a location remote from the source point, multiple geophones (an example of a signal receiver) are used to make separate recordings of the reflections of seismic waves caused by the explosions. The records are then added. Adding the records tended to cancel random noise while increasing the repeatable signal.

Another example of using multiple source signals added together is disclosed in Peacock, et. al., "Thumping Technique Using Full Spread Of Geophones", *Geophysics*, Vol. 27, No. 6, Part II., pp. 952–965 (Society of Exploration Geophysicists, December 1962). Peacock describes using a thumper as a signal source to generate multiple source signals from a localized area. The area from which Peacock describes the signal's origination comprises a 10×10 grid of points where a heavy weight is dropped onto the earth's surface, and the resultant received signals are added together.

Peacock also disclosed a field layout of the pattern of sources and receivers commonly known as "continuous coverage", wherein, for a given minimum depth of interest, the distance between successive source points is determined to provide continuous data at a minimum depth of interest with no overlap. Generally, the distance between a first and a second source point is about equal to the offset distance between the first source point and the furthest receiver used with that source point for the shallowest geologic layer of interest. In terms normally used in the industry, the source point interval was equal to the farthest offset of the geophone spread. The continuous coverage process is also commonly known as "100%" or "single fold" profiling.

It became recognized in the art that the above-described seismic methods had inherent errors, because the signals that were added together were reflected from substantially differing locations of the geologic layer of interest. For example, Peacock describes using a 10×10 grid of source element locations wherein the columns of the grid were spaced 60 feet apart, giving a total area of source element locations of 560 feet by 560 feet. In practice, the large area results in no two reflections which are both added and received from the same reflection point, nor even relatively close points, although they are from the same general area. Moreover, in Peacock's method, the arrival times of signal reflections are different, due to the resultant differences in total travel path lengths. Therefore, the signals that are added by Peacock's method give both poor lateral and vertical resolution.

It will be recognized by those of skill in the art that the term "reflection point" does not refer to a mathematically precise point, but rather an area at depth on a reflecting interface from which elemental seismic reflection energy is integrated to form the total observed reflection event. In general, a reflection point as used herein refers to an area having a diameter of about 1/10th the reflector depth, with the weighting of elemental reflection energies strongest in the center of this area.

Referring still to the Peacock reference, at that time there was little or no attempt to correct for timing errors created by the differing length ray paths. An even further problem with the traditional vertical stacking was that, with continuous coverage techniques, there was little or no redundancy of measurement of a given reflection point. Further still, there were severe limitations on the process due to noise.

These and other problems are addressed, although not solved, by a process generally known as "horizontal stacking"

Later Seismic Survey Methods—Horizontal Stacking

An example of horizontal stacking is generally described in U.S. Pat. No. 2,732,906, issued to Mayne on Jan. 31, 1956 and incorporated herein by reference. Mayne teaches a radically different method of seismic data acquisition in which the signals from particular patterns of source and receiver pairs are added, wherein the subsurface reflection point for each source and receiver pair is at the same position on the reflection interface. In the case where the surface and the geologic strata are substantially flat, the required source-receiver pairs result in the source and receiver horizontal positions being located the same distance from the reflection point of interest. See FIGS. 1 and 2 of Mayne.

This horizontal stacking method, now known by those of skill in the art as the "Common Depth Point" (CDP) or, more recently, the "Common Mid-Point" (CMP) method of data acquisition (hereafter referred to collectively as "common reflection point"), was refined over the years. Eventually, the common reflection point method totally replaced the vertical stacking and continuous coverage seismic data gathering procedures exemplified by Owen and Peacock. This refinement continued with the advent of high-speed, high-memory computers, because Mayne and later horizontal stackers taught that increasing the horizontal redundancy increased the signal-to-noise ratio. More and more receiver groups were used, and source points were moved closer and closer, such that there were many source points within the total spread of geophone groups, giving more and more traces from differing pairs of source points and receiver points that could be added together. As used herein, the term "traces"

refers to the graphical representations of signals received by receivers, as well as their electronic equivalents, as represented in a computer.

Attributes Of Horizontal Stacking

AVO Analysis

One of the benefits of horizontal stacking, compared with the earlier prior art, was the ability to perform Amplitude Variation with Offset ("AVO") analysis.

It will be recognized by those of skill in the art that before normal moveout correction of the traces gathered together in the common reflection point method, some traces are from source-receiver pairs that are further apart from each other than are the source-receiver pairs for other traces. As said by those of skill in the art, some traces have further offsets than others. If the traces are graphed on a grid having a horizontal scale in seconds of time between the source event and the reception of the signal that the trace represents and a vertical scale in feet of offset, the reflection signals for any particular reflection point will be on an approximate hyperbolic curve 1A1 (FIG. 1A), increasing in time as offset increases. This is called the "moveout curve". The common reflection point set of traces is typically called a "gather". Further, the amplitude of the reflection may change as offset increases. After normal moveout, the traces are added, and the result is graphed in the seismic section as a single trace, along with all other moveout-corrected traces from all other common reflection points. In the seismic section, the positive excursion of the traces are darkened, and the negative values are traced uncolored. The result (seen in FIG. 1B) shows correlative sequences of reflections from subsurface layers of rock interfaces plotted against time of arrival as a vertical axis and horizontal distance along the surface of the earth (or some selected datum).

Interpreters look for darkened areas under which they expect to find oil or gas. However, the darkened areas over which there may be oil or gas can look (in the common reflection point method) just like the darkened areas over which brine water will be found. Fortunately, however, it has been found that the amplitude of the reflection for any single trace from a single source-receiver pair will change with the offset distance between the source and receiver, and it will change differently for brine water than it will for a hydrocarbon. Therefore, interpreters will look to the individual traces in the gather, to analyze how the amplitude of the reflection changes with offset.

Such AVO analysis was not available with single coverage methods, because there were not multiple traces of reflections from the same reflection point.

Suppression Of Multiple Reflections

Another problem with single coverage methods was that of multiple reflections.

As will be understood by those of skill in the art, signals reflecting from one reflection point will travel back to the surface, or a higher transition layer, and reflect down, again. When they reach the original level from which they first reflected, they will again reflect upward, at which point they may be received at the surface. However, due to the extra travel path length for multiple reflections, the multiple reflection signal arrives at the receiver at a later time than its primary arrival time, which may correspond to other primary reflection signals from reflection points below the multiple reflection signal's original reflection level. Thus, unless multiple reflections are suppressed, the eventual seismic section will show false structure at depths where there may be no structure, or at least degrade the quality of the primary reflection data from deep levels with which such multiple reflections interfere. With single coverage methods, there was no capability for multiple reflection suppression, and the interpreter had to determine from the characteristics of the data what was a multiple and what was a primary reflection event.

In the common reflection point method, it was found that the moveout curve for multiple reflections was different from the moveout curve of the primary reflections arriving at about the same time as the multiple. Accordingly, if the difference in offset between the shortest offset trace and the longest offset trace was sufficient, then the synchronization of the traces in the gather according to the primary reflection hyperbola would cause the multiple reflections to appear as under corrected primary events. Accordingly, when the normal moveout-corrected traces in a gather were added to form a single trace element of the seismic section, the multiple reflections, not being equally well synchronized, were suppressed relative to the synchronized primary reflector.

Again, without a multiplicity of traces from source-receiver pairs having a significant difference in offset, multiples could not be suppressed. Modern-day common reflection point methods use many channels (as many as 960 or more) and long offsets (typically as much as 20,000 feet), thus allowing for both AVO and multiple reflection suppression. However, modern-day methods introduce other inaccuracies.

Inaccuracies In The Common Reflection Point Method

Some of the assumptions used in the signal processing steps necessary for use of the prior art common reflection point method have been found to be inaccurate. For example, the signal path for source-receiver pairs used in the common reflection point methods do not all travel at the same velocity. If the signals were moving through homogeneous material, path length differences would cause the moveout curve to be exactly hyperbolic, and the timing corrections using the hyperbolic curve of the primary reflections in the gather (typically called "normal moveout" or "NMO") would be accurate. However, the real world is not homogeneous. Therefore, in many situations, the velocity of propagation is different for the various paths of travel and for various parts of each path. These errors are commonly termed "non-hyperbolic moveout errors" and "static errors".

To address this problem in the prior art, the common reflection point method applies time correction to the data, based on simple (and known to be inaccurate) models. NMO is one example of a synchronization process, where differences in common reflection point arrival times are computed based on a simple model. In that model, one homogeneous layer from the surface to the reflector and a common average velocity in this layer for all ray paths with the common reflection point are presumed. The time of signal reception for any source-receiver pair with a given offset distance is assumed to be defined by a second order equation which expresses the observed arrival time as a function of a common source-receiver position at the midpoint of the pair, the offset distance between the pair, and the average velocity of propagation over the entire travel path. This velocity of propagation is assumed to be the same for all travel paths associated with data in a common reflection point "gather". The NMO process also assumes that the velocity of propagation for any given event is a constant value equal to the root-mean-square average of all local layer velocities along the path of propagation for all offset observations exhibited in the gather. These assumptions are known to be in error.

As another example, signals traveling through the materials within about 500 feet of the surface, either down-going from the source or up-going to the receiver, are subjected to considerable local travel-time differences, because of the heterogeneity of shallow, unconsolidated or altered materials. These timing errors are called "sub-weathering static errors", and another synchronization process is applied in the prior art common reflection point method to try to correct for such errors before adding signals in the gathers. According to the sub-weathering synchronization process, a simple model of vertically-traveling energy near the surface at both source and receiver locations is used. These estimates always have some residual error, partly because of the failure of this simple model to hold, and because of additional noise in the measurements used to make the model. The identity of locations along the seismic profile where these residual errors occur is obscured when the data is added, resulting not only in degradation of the data quality, but also in eliminating any ability to clearly observe and take such errors into account when the data is interpreted.

One very common source of non-random, but indeterminable, error in the prior art common reflection point methods exists due to localized geologic anomalies in the subsurface. For example, FIG. 1C shows a typical set of ray paths 10a–10t for a common reflection point process for a particular reflection point 12 at sub-surface transition layer 13. The assumptions used to synchronize the ray paths 10a–10t are not able to correct for the velocity changes caused by localized anomalous geologic formations 14a–14c. Those velocity changes will occur for some seismic signals, but not all, giving a smeared result after addition. Further, the types of anomalies 14a–14c (or even their existence) are difficult to detect, because the anomalies 14a–14c do not intersect all, or even most, of the ray paths 10a–10t in the prior art common reflection point method. Thus, there is a need to have some method to effectively utilize redundancy without introduction of error caused by anomalous geologic formations in the various propagation paths of data being added.

Addition of signals after imperfect synchronization results in the loss of higher frequencies, the loss of resolving power, and (possibly more importantly) the loss of the seismic interpreter's ability to detect that error exists. Without detection of the error, there is no ability to pinpoint its cause or take the cause into account during interpretation. Therefore, there is inherent error introduced by the prior art common reflection point method. Such error cannot be accommodated by existing practice.

This class of non-random but unmeasurable errors in the common reflection point stacking methods give rise to attempts to reduce such errors by the use of complicated processes such as multi-channel stacking filters, discussed in Galbraith, J. N., "Characteristics of Optimum Multichannel Stacking Filters", *Geophysics*, Vol. 33, No. 1, pp. 36–48 (February 1968), incorporated herein by reference. Such extra complexity is not desirable, and such filtering can also remove information that is desired.

Horizontal Noise

Another major problem in all seismic exploration is that of a non-random but complex phenomenon called "horizontal noise" (a.k.a. source-generated noise). Horizontal noise comprises seismic waves radiating radially away from the source points traveling through the near-surface layers of the earth, and are generated by the source. Such waves travel at a speed slower than the reflected seismic waves of interest. Therefore, for any given depth-point of interest, there is a distance from the source along the surface at which the reflected seismic wave will arrive substantially at the same time as the horizontal noise. Further, horizontal noise has many components, each of which travels at a slightly different speed, causing the composite of all such noise modes to appear longer in time duration and to be worse at the greatest source-receiver distances. To a significant degree, some form of horizontal noise is coincident with nearly all reflections at all offsets on all records.

In the prior art common reflection point methods described above, receiver and source arrays have been proposed to reduce the effect of horizontal noise, as is known to those of skill in the art and described in Anstey, N. A., "What Ever Happened To Ground Roll?", *Geophysics: The Leading Edge of Exploration*, pp. 40–45, March 1986, incorporated herein by reference. Anstey notes that, in the field, in the common reflection point method, the accepted practice is to use a geophone group length (group length being defined as the distance over which elements of the geophone group are placed) designed to suppress horizontal noise. The group length is, in practice, about the same as the geophone group interval (group interval being defined as the distance between the center of two geophone groups). Anstey notes that for the prior art common reflection point practice, the receiver array must have a length equal to twice the source interval and/or vice versa. He also notes that the source interval (the distance between the center of two source points) should be 10 half of the group interval for end-on spreads and equal to the group interval for split spreads. Anstey further notes that the goal in the prior art common reflection point gather method for suppressing horizontal noise is to have a continuous, uniform succession of sampling points across the common reflection point gather (hereinafter, sometimes referred to as the Anstey "stack array"). However, in practice, the Anstey stack array has been rejected, because it is too expensive.

The excessive expense exists because of competing factors in the suppression of horizontal noise. Those competing factors include lateral resolution and high frequency response. For example, a client for seismic data will specify a maximum frequency of interest (hereinafter designated as "$f_{max}$"), which must not be degraded by more than a particular percentage, as understood by those of skill in the art. As the geophone group length goes up to suppress horizontal noise, the high frequency response goes down. Also, to increase the lateral resolution of the data, common wisdom suggests that receiver group intervals should be short. With short group lengths for preserving high frequencies, there is the necessity for even shorter group intervals.

Shooting or vibrating sources every group interval (as is the requirement if the group length is twice the group interval), as suggested by Anstey, requires a source point spacing equal to the group interval. The number of source points required per unit of length of the seismic profile becomes excessively large, and the expense of acquisition becomes prohibitive. Therefore, common practice is to place a source point every second to fourth group interval for a split spread of (typically) 120 or more groups having group lengths of 80 to 110 feet. Further, keeping the same example distances, Anstey requires receiver group intervals of 160 to 220 feet for sources placed at every other group interval, or 320 to 440 feet for sources placed every fourth group interval. Such a requirement severely damages high frequencies in the recorded data.

It can be seen from the above discussion that with traditional vertical stacking methods, and the horizontal stacking methods that replaced vertical stacking, seismic data gathering techniques are unavailable that are capable of suppressing horizontal noise while still providing high lateral resolution and high frequency response. As will be more fully described below, the present invention provides a solution to this long-standing trade off. Further, the methods that suppress multiple reflections and allow for AVO analysis actually introduce error due to their known-to-be incorrect assumptions in synchronization. The present invention addresses these problems and tradeoffs.

INFORMATION DISCLOSURE

Pursuant to the duty of disclosure, and by way of further background, the following patents and articles found during a prior art search are provided as follows:

U.S. Pat. No. 2,684,468 issued to C. D. McClure, et al., and incorporated herein by reference, describes one of the problems addressed by the present invention. McClure teaches addressing that same problem by using analog equipment with the successive generation, storage, and feed back of seismic recordings.

U.S. Pat. No. 3,278,893 issued to D. Silverman, and incorporated herein by reference, discloses an attempt to initiate a seismic signal and detect its response from the subsurface. Then, another signal is applied to the ground that is the negative of the first.

U.S. Pat. No. 3,747,056 issued to Treybig, et al., and incorporated herein by reference, identifies a method of horizontally adding traces from different points on a wave train.

U.S. Pat. No. 4,953,657 issued to Edington, and incorporated herein by reference, teaches a method of seismic data acquisition in which many sources are activated quickly to reduce the time taken to make the survey.

U.S. Pat. No. 2,740,489 issued to J. E. White, et al., and incorporated herein by reference, discloses a method of generating shearwaves useful with an embodiment of the invention.

U.S. Pat. No. 3,212,599 issued to H. C. Johnsen, and incorporated herein by reference, discloses a method and system for connection of wires and seismic cable to facilitate switching of receiver stations.

U.S. Pat. No. 2,991,447 issued to A. C. Winterhalter, et al., and incorporated herein by reference, discloses an analog recording device for holding a series of seismic records to be later added.

U.S. Pat. No. 3,286,783 issued to J. T. Chery, Jr., et al., and incorporated herein by reference, discloses a method of generation of horizontal shearwaves.

U.S. Pat. No. 3,539,982 issued to J. A. Hileman, et al., and incorporated herein by reference, discloses a method for computing "sub-weathering static" time corrections for a CDP data acquisition method.

U.S. Pat. No. 4,206,509 issued to Ruehle, and incorporated herein by reference, discloses another time correction method for the CDP data acquisition method.

U.S. Pat. No. 4,481,612 issued to Curran, and incorporated herein by reference, discloses a method and system for generation of shearwaves and a bore hole.

U.S. Pat. Nos. 4,686,655 and 4,944,036 issued to Hyatt, and incorporated herein by reference, discuss a time-share system for use with several channels of seismic data, using only the polarity of a signal at each sample. Hyatt apparently uses this method to increase the number of channels used in the field, which is consistent with the trend in the CDP method for increasing the number of receivers in a spread.

U.S. Pat. No. 5,031,717 issued to Hardee, et al., and incorporated herein by reference, discloses yet another downhole shearwave generator, as does U.S. Pat. No. 5,080,189 issued to Cole.

Brown, R. J., et al., "Weighted Vertical Stacking In Crustal Seismic Reflection Studies On The Canadian Shield," *Geophysical Prospecting*, Vol. 25, No. 2, pp. 251–268 (June 1977), discusses weighted vertical stacking to increase signal-to-noise ratio using a linear spread of 12 geophone detectors and 12–18 shots per shot point.

Levin, F. K., "Vertical Stacking As A Reflection Filter," *Geophysics*, Vol. 42, No. 5, pp. 1045–1048 (August, 1977) discusses improving signal-to-noise ratio in a CDP method by summing several traces having the same source-to-geophone separation, but different CDP points.

Lambright, O. N., "100% (Single-Fold) VS. CDP (Multifold) With Today's Budgets," *Geophysics: The Leading Edge Of Exploration*, Vol. 51, No. 12, pp. 22–26 (December, 1986), discloses a comparison of quality and costs of single-fold versus CDP methods.

Laster, S. J., "The Present State Of Seismic Data Acquisition: One View," *Geophysics*, Vol. 50, No. 12, pp. 2443–2451 (December, 1985), discusses developments in seismic data acquisition during the 25 years preceding December of 1985.

Macelwane, J. B., "Fifteen Years Of Geophysics: A Chapter In The Exploration Of United States And Canada, 1924–1939" *Geophysics*, Vol. 5, No. 3, pp. 250–258 (July, 1940), generally discusses the use of reflection seismic data processing through 1940.

Gardner, L. W., "Vertical Velocities From Reflection Shooting," Geophysics, Vol. 12, No. 1, pp. 221–228 (January, 1947), discloses methods of arranging shot points and detectors to minimize error due to angularity corrections and reflections seismic graph procedures.

Dankbarr, J. W. M., "The Wavefield Generated By Two Vertical Vibrators In Phase And In Counterphase," *Geophysical Prospecting*, Vol. 31, No. 6, pp. 873–887 (December, 1983), discusses the radiation characteristic of two vertical vibrators in phase and counterphase is investigated. The reference is provided as general background.

Further discussion of the Anstey stack-array concept is seen in the following references, all of which are incorporated herein by reference:

Anstey, N. A., "Field Techniques For High Resolution," *Geophysics: The Leading Edge of Exploration*, Vol. 5, No. 4, pp. 26–34 (April, 1986).

Correspondence between Robert L. Coultrip, Steve Foster, and Nigel Anstey, *Geophysics: The Leading Edge of Exploration*, Vol. 5, No. 6, pp. 8–10 (June, 1986).

Published letters by Robert H. Sambell and Howard L. Taylor, *Geophysics: The Leading Edge of Exploration*, Vol. 5, No. 10, pp. 10–11 (October, 1986).

"A Reply by Nigel Anstey," *Geophysics: The Leading Edge of Exploration*, Vol. 5, No. 12, pp. 19–21 (December, 1986).

Published letters by M. Ali Ak and Ola Eiken, *Geophysics: The Leading Edge of Exploration*, Vol. Vol. 6, No. 7, pp. 28–30 (July, 1987).

A Reply by Nigel Anstey to letters of Mr. Ak and Mr. Eiken, "Discussion of the Stack-Array Concept Continues," *Geophysics: The Leading Edge of Exploration*, Vol. 6, No. 7, pp. 32, 48 (July, 1987).

Letter of M. Ali Ak in reply to Anstey's reply, *Geophysics: *The Leading Edge of Exploration*, Vol. 7, No. 2, p. 8 (February, 1988).

Published letter by William C. Pritchett, *Geophysics: The Leading Edge of Exploration*, Vol. 7, No. 12, p. 8 (December, 1988).

Anstey, N. A., "Stack-Array Discussion Continues," *Geophysics: The Leading Edge of Exploration*, Vol. 8, No. 3, pp. 24–25, 31 (March, 1989).

SUMMARY OF THE INVENTION

According to the present invention, minimizing the offset range between ray paths which are synchronized in a common reflection point gather, especially where the signal-to-noise ratio is about 0.2 or above, results in a surprising increase in data quality, while at the same time reducing the overall cost of data acquisition. Further, conformal mapping of traces having a larger difference in offset has been found to give superior data quality and reduce costs. Further still, design criteria for both field layout of source points and receivers, as well as procedures for processing data gathered in the filed have been found which increase frequency response and reduce long wavelength noise.

According to one embodiment of the invention, there is provided, a process for seismic data gathering comprising: collecting a first set of multiple signals from a first set of ray paths, wherein the first set of ray paths originate from a first source point and are received at a first receiver point; organizing a plurality of the first set of multiple signals into a first set of clusters; and collecting a second set of multiple signals from a second set of ray paths, wherein the second set of ray paths originate from a second source point and are received at a second receiver point. As used herein, a "source element location" refers to a point from which a specific seismic signal is generated. Multiple source element locations usually make up what those of skill in the art term a "source point".

According to a further embodiment of the invention, there is provided, a process for creating a seismic section from traces received from seismic signal receivers, the process comprising: generating a first common reflection point gather of a first set of traces, wherein the first set of traces represent seismic signals originating from a first source point, the first source point comprising multiple source element locations; synchronizing a plurality of the first set of traces within the first common reflection point gather; and adding the synchronized signals within the first common reflection point gather. Further in accordance with this embodiment, there are provided the further steps of: generating a second common reflection point gather of a second set of traces, wherein the second set of traces represent seismic signals originating from a second source point, the second source point comprising multiple source element locations; synchronizing a plurality of the signals within the second common reflection point gather; and adding the synchronized signals within the second common reflection point gather; wherein the first and the second source points are about as far apart as one-half the distance along the traverse covered by the receiver groups when receiving signals, and wherein the seismic signals received from the first and second source points are continuous samplings along the traverse from the same depth level.

According to yet a further embodiment, there is further provided generating a third common reflection point gather of a third set of traces, wherein the third set of traces represent seismic signals originating from a third source point, the third source point comprising multiple source element locations; and synchronizing a plurality of the signals within the third common reflection point gather; wherein the third source point is located between the first and second source points, and wherein the energy used at the third source point is less than the energy used at either the first or the second source points.

According to an alternative embodiment, the adding of the synchronized signals within the first common reflection point gather defines a first added signal, and the adding of the synchronized signals within the second common reflection point gather defines a second added signal, and there are further provided the steps of: conformal mapping the first added signal to the second added signal, thereby defining a first mapped signal and a second mapped signal, and adding the first and second mapped signals.

According to yet a further alternative embodiment, each trace in the first set of traces is formed by adding together, without synchronization, signals received at a single receiver group from multiple source element locations in the first source point.

High redundancy of signals from a given reflection point of interest in the geologic strata is gained by generating seismic signals from the same or very closely spaced source locations. The reflections received from those closely spaced sources are added (for example directly by hardware at the point of recording, or later with a computer) without synchronization. Therefore, the number of ray paths which need correction by the inherently error-producing synchronization techniques is greatly reduced. Alternatively, very few signals are generated at each source point, and these signals are added with only a small amount, or no synchronization. Still, all synchronized points are from the same source point and receiver point pair. The number of synchronized signals having a common reflection-point is small, by design.

One advantage of this embodiment of the present invention is that by requiring those signals that are in need of synchronization to be from the same source/receiver point pair, the synchronized signals have very similar ray paths. Therefore, a majority of the synchronized signals are likely to be affected by the same anomalies and to substantially the same extent. Further, the synchronization is much more accurate than in the prior art, even with simplified models, because the signals being synchronized have essentially the same velocity. Further still, the portion of synchronization correction caused by such anomalies (which is different than for other sets of data being similarly processed) is clearly observable without degradation of the signals. Thus, any error caused by the synchronization is detected and corrected during further signal processing or interpretation.

It should be remembered that a "source point", as used herein, denotes a general area from which a number of seismic signals are generated at various source element locations. Examples include "shot points" and "vibrator points".

According yet a further embodiment of the invention, a plurality of the first set of multiple signals are organized into a first set of "clusters". A cluster, as used herein, comprises a group of ray paths whose origins comprise seismic signal sources placed at specific source element locations. According to one embodiment, the ray paths of a first cluster are located between the ray paths of a second cluster. According to alternative embodiments, the clusters overlap, are spaced apart, or are contiguous. According to yet a further alternative, there is only one source element location per cluster. Also used herein is the term "source cluster", which refers to groupings of source element locations within a source point.

According to a further embodiment of the invention, a plurality of the signals within the same cluster are added together without synchronization to create a single "cluster signal" for that cluster. Such adding is done for a plurality of the clusters, resulting in single cluster signals for each cluster. According to embodiments where the source clusters include only one source element location, the cluster signal for the cluster includes only one signal.

According to a further embodiment, a plurality of the cluster signals are sorted into common reflection point gathers, wherein each cluster signal within any common reflection point gather has a reflection point in common with every other cluster signal in the same common reflection point gather. Synchronizing (for example, normal moveout) of a plurality of the cluster signals within each gather is also performed. Then, a plurality of the synchronized cluster signals within one of the gathers are added together, and such adding occurs within a plurality of the gathers, thereby producing a set of synchronized gather signals.

According to a further embodiment of the invention, a plurality of the set of synchronized gather signals, or alternatively, a plurality of the set of synchronized cluster signals, is displayed on a graph.

According to a further embodiment of the invention, there is provided a process for creating high quality field records in seismic data gathering comprising: a) generating a seismic signal at a source point; b) receiving reflections of the seismic signal at a plurality of receivers, and receiving noise at the plurality of receivers while receiving the reflections of the seismic signal, the reflections and the noise defining a received signal; c) recording the received signal, thus defining a recorded signal, the ratio of the amplitude of the reflections of the seismic signal to the amplitude of the noise defining a signal-to-noise ratio; d) repeating steps a and b; e) adding the received signal to the recorded signal, thus defining an added signal; f) repeating steps a through e until the signal to noise ratio of the added signal is 0.2 or greater.

According to alternative embodiments, steps a through e are repeated until the signal-to-noise ratio of the added signal is about 0.5. 0.8 or greater, or 1.0 or greater, respectively.

According to still further alternative embodiments, the generating is accomplished with a vibrator, an explosive, shear wave generators, compression wave generators, marine sources, etc.) as are known to those of skill in the art.

According to still a further embodiment of the invention, there is provided a process for generating a seismic section from multiple traces recorded from seismic receivers along a traverse and reducing the degradation of a maximum frequency of interest below a maximum degradation percentage, the process comprising: determining a maximum range of offset for synchronization of traces having a common reflection point such that upon addition of the traces after synchronization, the maximum frequency of interest is degraded by a degradation amount about equal to or less than the maximum degradation percentage; choosing a first set of traces, the difference in offset between any two traces in the first set of traces being about equal to or less than the maximum range of offset; synchronizing the first set of traces; and adding together the first set of traces. As used herein, the "offset" of a trace refers to the distance between the source and receiver pair for that trace.

According to one embodiment, the determining comprises: choosing, arbitrarily, an offset value for the maximum range of offset between any two traces to be synchronized; b) synchronizing a first test set of traces having offsets no greater than the maximum range of offset in a first test common reflection point gather, wherein the common reflection points of the first test set of traces are below a first location along the traverse, thereby defining a first synchronized test set of traces; c) adding the traces in the first synchronized test set of traces, thereby defining an added test trace; d) determining the degradation amount of the maximum frequency of interest in the added test trace; e) adjusting the maximum range of offset in an appropriate direction and amount, depending from the amount of degradation of the maximum frequency of interest; f) repeating steps a through e until the degradation amount of the maximum frequency of interest in the added test trace is less than the maximum degradation percentage.

According to an alternative embodiment, the determining comprises: a) choosing an offset value for the maximum range of offset; b) synchronizing a first test set of traces in a first test common reflection point gather, wherein the common reflection points of the first test set of traces are below a first location along the traverse, thereby defining a first synchronized test set of traces; c) adding the traces in the first synchronized test set of traces, thereby defining a first added test trace; d) determining a first degradation amount of the maximum frequency of interest in the first added test trace; e) synchronizing a second test set of traces in a second test common reflection point gather, wherein the common reflection points of the second test set of traces are below a second location along the traverse, thereby defining a second synchronized test set of traces; f) adding the traces in the second synchronized test set of traces, thereby defining a second added test trace; g) determining a second degradation amount of the maximum frequency of interest in the second added test trace; h) repeating steps a through g until the average of the first and the second degradation amounts is less than the maximum degradation percentage.

According to still further embodiments, the traces have a signal-to-noise ratio of about 0.2, 0.5, 0.8, 1.0, or higher.

According to yet a further embodiment of the invention, there is provided a process for suppression of a predetermined wavelength L of horizontal noise in seismic data, the process comprising: choosing a first set of traces at a first set of receiver groups, the first set of receiver groups being spaced by m receiver group intervals, the receiver group interval having a length of about d, each of the first set of traces being from a first source cluster, the first source cluster being located at a first source point having k source clusters; choosing a second set of traces at a second set of receiver groups, the second set of receiver groups being spaced by m receiver group intervals, the receiver group interval having a length of about d, each of the second set of traces being from a second source cluster, the second source cluster being located at the first source point; grouping traces from the first and second sets of traces into a first set of gathers, wherein the midpoint between the source cluster and the receiver group for each trace in any gather is the same; synchronizing each trace in a particular gather of the first set of gathers with every other trace in the particular gather, thus defining a synchronized set of traces; repeating the synchronizing for each gather in the first set of gathers; adding the synchronized traces, whereby a set of added traces is defined, one added trace for each of the first set of gathers; defining an integer q equal to the greater of the receiver group length or the source cluster length, in units of receiver group intervals; generating a set of running sum traces from the set of added traces with an n-trace running sum, according to the following relationships: $n=(2m)/q$ and $(L/d)=2mk+(q/2)$.

According to a further embodiment, the grouping reduces the degradation of a maximum frequency of interest below a maximum degradation percentage, the grouping comprising: determining a maximum range of offset for synchronization of traces having a common reflection point whereby, upon addition of the traces after synchronization, the maximum frequency of interest is degraded by a degradation amount about equal to or less than the maximum degradation percentage; and choosing a first set of traces, the difference in offset between any two traces in the first set of traces being about equal to or less than the maximum range of offset.

According to a further embodiment, the determining comprises: a) choosing an offset value for the maximum range of offset; b) synchronizing a first test set of traces in a first test common reflection point gather, wherein the common reflection points of the first test set of traces are below a first location along the traverse, thereby defining a first synchronized test set of traces; c) adding the traces in the first synchronized test set of traces, thereby defining an added test trace; d) determining the degradation amount of the maximum frequency of interest in the added test trace; e) repeating steps a through d until the degradation amount of the maximum frequency of interest in the added test trace is less than the maximum degradation percentage. According to still a further embodiment, there is further provided: f) adding the traces in the second synchronized test set of traces, thereby defining a second added test trace; g) determining a second degradation amount of the maximum frequency of interest in the second added test trace; h) repeating steps a through g until the average of the first and the second degradation amounts is less than the maximum degradation percentage.

According to alternative embodiments, the above processes are carried out with traditionally known sources, receivers, recording devices and computational devices (for example, computers).

The above summary is given by way of example only and is not intended as any limitation of the invention.

DESCRIPTION OF THE DRAWINGS

For a more complete understanding of the present invention and for further advantages thereof, reference is made to the following Description of Example Embodiments Of The Invention, taken in conjunction with the accompanying drawings, in which:

FIG. 2 shows an example of the component parts of a receiver point in schematic form.

FIG. 3 is a diagram of a field layout of a pattern of source points and receiver points used according to one embodiment of the invention.

FIGS. 5A–5C are trace records from differing source clusters.

FIG. 11G is a graph illustrating another method of designing an embodiment of the present invention.

Figure 1A:
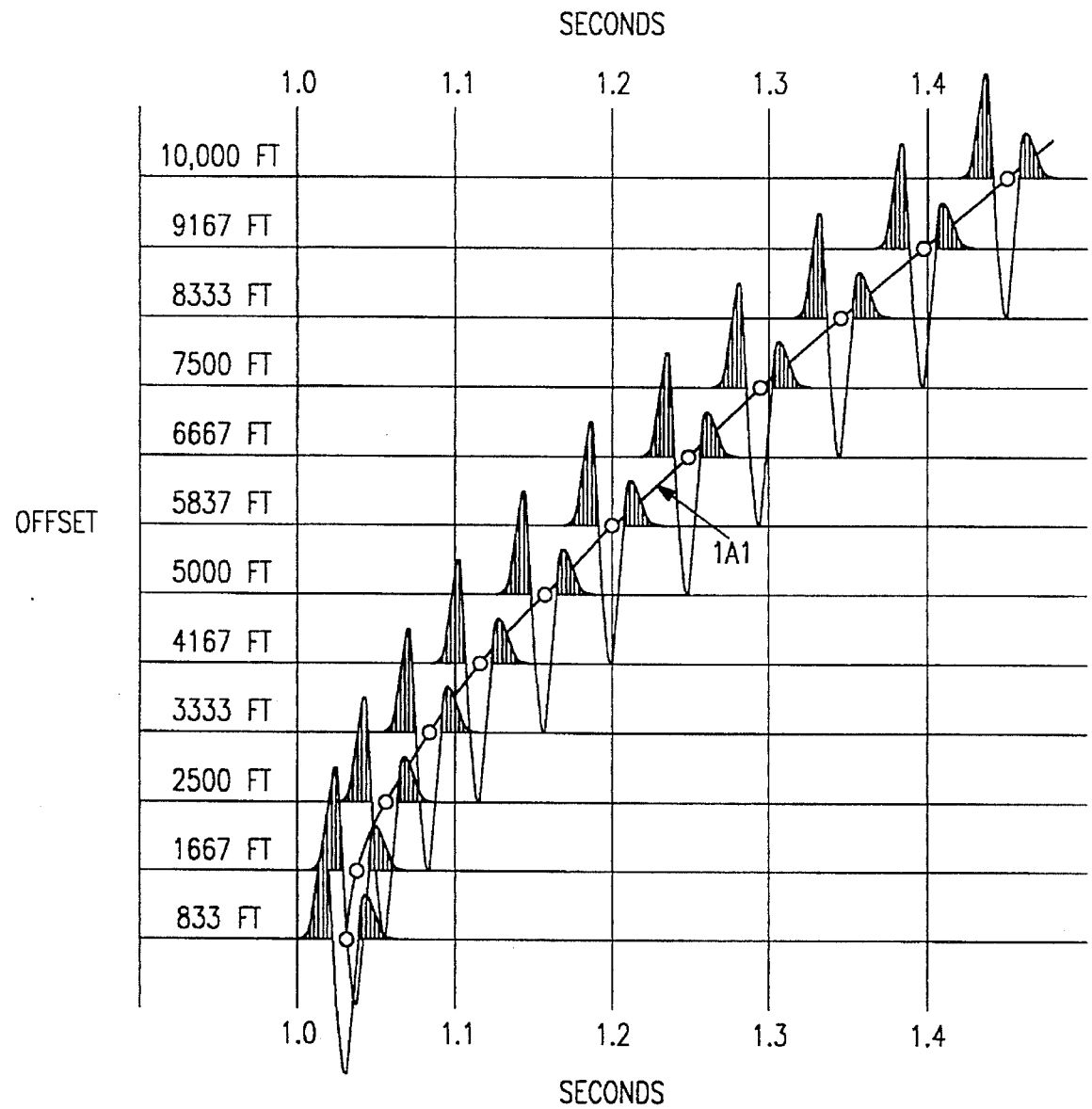
FIG. 1A shows a gather of traces having reflections from the same reflection point, but at different arrival times.

It is to be noted, however, that the appended drawings illustrate only typical embodiments of this invention and are therefore not to be considered limiting of its scope.

DESCRIPTION OF EXAMPLE EMBODIMENTS OF THE INVENTION

Referring to FIG. 2, an example is shown of a receiver point RP which is useful with the invention, wherein receiver point RP includes four receiver groups 21–24 (for example, geophone or hydrophone groups comprising seismic signal sensors 21a–24a). Acceptable examples of sensors 21a–24a include, but are not limited to, pressure detectors as used for marine surveying, particle velocity detectors as used for detecting P-wave events, particle velocity detectors as used for detecting all three orthogonal particle velocities as waves arrive at the detector (three component detectors), and shear wave detection as commonly done by computer reduction of three component detector responses. According to the specific example of FIG. 2, twelve sensors 21a–24a are hard-wired together for each of receiver groups 21–24. Each of receiver groups 21–24 are connected to a recording truck 25, as is known in the art, via geophone channel cables 21b, 22b, 23b, and 24b. A "group width" (gw) is defined for each receiver group as the distance between the furthest sensors within each group. A "group interval" (gi) is defined as the difference in distance between the centers of each receiver group.

Referring now to FIG. 3, a field layout of source points and receiver points is shown as is used according to one embodiment of the present invention. Three source points SP1–SP3 are shown in a split-spread configuration. Receiver points RP1–RP10 are spread on one side of source point SP1. Likewise, receiver points RP11–RP19 are spread on the other side of source point SP1. If continuous coverage across the source point location is desired, receiver point RP20 is used. Alternatively, an end-on spread may be used with consecutive source points spaced at ½ the distance between any source point and the furthest receiver point.

According to one embodiment of the invention, receiver points RP1–RP36 of FIG. 3 each comprise a set of seismic receiver groups such as shown in FIG. 2, in which there is a 50% overlap between receiver groups within each receiver point. Further, referring again to FIG. 3, each receiver point is spaced substantially equally, and one receiver group of each of receiver points RP1–RP36 overlaps, by about 50%, one group from each adjacent receiver point. Thus, there is a 50% overlap of all receiver groups on each side of source point SP1. The geophone groups of each of receiver points RP1–RP36 are connected to a recording truck, as will be understood by those of skill in the art and as shown by way of example in FIG. 2.

According to still a further embodiment, the receiver points are uniformly spaced on a traverse line and the source points are uniformly spaced on a line offset from, but parallel to, the traverse line at source intervals equal to, or a substantial fraction of, the group spread length (source point to farthest receiver point distance), such fraction being rarely less than one-fourth.

Figure 4:
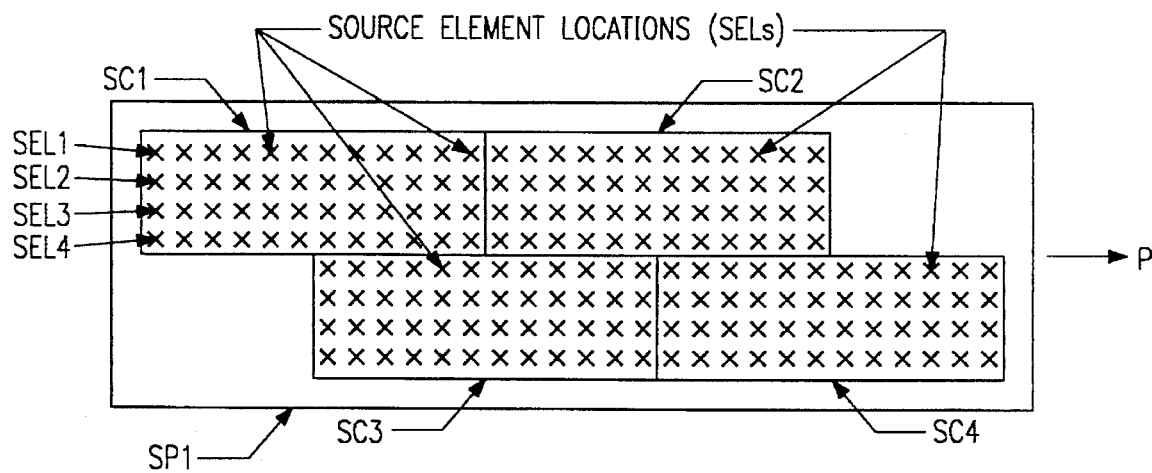
FIG. 4 is a diagram of a field layout of a pattern of source element locations within a pattern of source clusters used according to one embodiment of the invention.

Referring now to FIG. 4, an example of a source point suitable for use according to one embodiment of the present invention is shown, in which a plurality of source element locations (for example, SEL1–SEL4) are arranged in source clusters SC1–SC4. Each SEL designates a position from which a seismic signal is imparted. For example, according to one embodiment of the invention, four vibrator trucks begin at SEL1–SEL4 and impart a single seismic signal from each vibrator. Each vibrator truck then moves forward to the next source element location in the same row, and another seismic signal is imparted from each vibrator truck. Examples of alternative sources includes explosives, air guns, water guns, shot-gun shells, etc.

The order in which seismic signals are imparted from each source element location is unimportant to the practice of the invention, as the formation of clusters of signals may be done by sorting received signals or traces. Further, according to an alternative embodiment, a single source element location for each cluster is used. Numerous other patterns of imparting seismic signals to the various source element locations are used alternatively, depending upon topography, equipment availability, etc.

Although the embodiment of FIG. 4 is shown with source clusters SC1 and SC2 laterally offset to clusters SC3 and SC4, the clusters SC3 and SC4 may actually overlap clusters SC1 and SC2, occupying successively the same locations as those occupied by SC1 and SC2. According to the shown embodiment, a first set of seismic signals is imparted to the earth at source element locations within the first source cluster SC1 of source point SP1. A plurality of the signals received at receiver points RP1–RP19 (FIG. 3) are added together by some selected series-parallel connection of receiver elements, and different source signals from elements in each cluster are added together in recording instruments (for example, digital recording instruments) which contain storage and reproduction capability. According to alternative embodiments, other means that will occur to those of skill in the art are used for combining the various source element and individual geophone element signals in an additive manner without synchronization. The result of the addition is recorded as a set of cluster signals. There is one cluster signal for each source cluster—receiver group pair used to record a seismic trace.

Next, seismic signals are imparted to the earth at the source element locations of the second cluster SC2 of source point SP1, and the signals received at receiver points RP1–RP19 (FIG. 3) are summed and recorded as another set of cluster signals.

The process continues for the total number of clusters present at source point SP1. It should be noted that although FIG. 4 shows an example of four clusters SC1–SC4 having 48 source element locations per cluster, numerous variations of the number of source element locations and source clusters will be used in the practice of this invention, depending upon the noise wavelengths, topography, types of sources used, depth of interest, etc. No single configuration for a particular cluster is preferred for all applications.

Referring still to FIGS. 3 and 4, a separate cluster signal is kept for each receiver group and each cluster of source point SP1. After a seismic signal has been imparted at each source element location (SEL) of source point SP1, a similar pattern of source clusters and source element locations is used at source point SP2 (FIG. 3) from which further source signals are imparted. To receive the seismic signals imparted from source point SP2, receiver points RP11–RP18, RP20 (formerly source point SP1), and RP21–RP30 are used. According to one embodiment, receiver point RP19 is coincident with source point SP2 and is not used for receiving signals from source point SP2. According to an alternative embodiment, in which source point SP2 is offset from RP19, as shown in FIGS. 3 and 4, RP19 is used.

The process of imparting signals to the earth from source point SP2 is the same as the process described above with respect to source point SP1, and cluster signals are recorded for each cluster of source point SP2 at each receiver group in each of receiver points RP11–RP18, RP20, and RP21–RP30. The process continues, for example, at source point SP3, and any other source points desired. The number of source points will depend upon the length of the traverse to be mapped.

The above process results in numerous cluster signals which have a common reflection point, and which also have common source and receiver points that are distinctly limited in total horizontal range of position along the recording line. Thus, the ray paths making up those cluster signals are substantially similar. However, the geophone groups and source clusters associated with those ray paths, taken as a whole, form an array which is effective for suppression of horizontal noise after synchronization. Thus, a gather of cluster signals having a common reflection point and limited range source and receiver points is generated, and the cluster signals within each common reflection point gather are synchronized and added.

Figure 5:
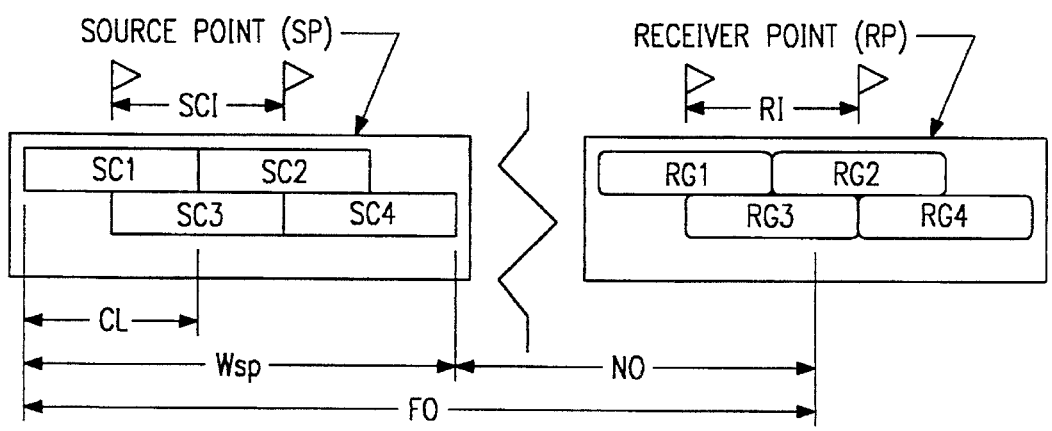
FIG. 5 is a relational diagram of distance definitions between source points and receiver points used according to one embodiment of the present invention.

Referring now to FIG. 5, various relationships used according to one embodiment of the invention are defined. The "near offset" (NO) for any source point is the distance between the center of any receiver point (for example, receiver point RP19 for source point SP1 of FIG. 3) to the nearest source element of SP1. The far offset (FO) is defined as the distance from the center of the same receiver point (for example, RP19 for source point SP1 of FIG. 3) and the source element location (in SP1) furthest from that receiver point. The cluster length (CL) is the furthest distance between any two source element locations within the cluster.

Using the above definitions, the design criteria for an embodiment of the invention will be explained. For a given seismic data gathering project, the minimum depth of interest (expressed as a reflection arrival time for a zero offset source and receiver), the highest frequency reflection to be retained, and the longest wave length horizontal noise are known. From the equation:

$$(100\%) \frac{\sin(2\pi f_{max} \Delta t)}{2\pi f_{max} \Delta t} = K$$

$\Delta t$ can be calculated, which limits the width CL of the source cluster, where $f_{max}$ represents the highest frequency of interest. K represents the percentage level of the amplitude of $f_{max}$ to which the amplitude of $f_{max}$ may drop as a result of adding traces. According to this design criteria, the following two formulas are used:

$$t_{x1}^2 = t_o^2 + (x_1/v)^2$$

$$t_{x2}^2 = t_o^2 + (x_2/v)^2$$

$x_1$ = the far offset (FO).

$x_2$ = the near offset (NO).

v = the velocity of propagation (average) (a/k/a stacking velocity or rms velocity).

$t_o$ = elapsed time between source event and register of a reflection of interest, assuming the source and receiver were both directly positioned over the point of interest (zero offset).

$t_{x1}$ = time of actual reception of a signal from the source element location at the far offset FO to the furthest center of the receiver (for example, RP19 for source point SP1 of FIG. 3) from the reflection of interest.

$t_{x2}$ = time of actual reception of the same signal as $t_{x1}$ originating from a source event location at the near offset (NO) to the center of the further receiver (for example, RP19 for source point SP1 of FIG. 3).

Using the formulas above, $\Delta t$ = the absolute value of ($t_{x1} - t_{x2}$), and $\Delta x$ = the absolute value of ($x_1 - x_2$). Solving for $\Delta x$, gives the preferred width of each cluster and the preferred group width of each receiver group. The goal in the solution is that $\Delta x$ be such that $\Delta t$ is less than the limit set by the designations of $f_{max}$ and K. The result of following such a criteria is that adding of the reflections received from a particular source cluster to create a cluster signal is sufficiently accurate up to the frequency $f_{max}$ without the need for synchronization.

It is always the case, however, that cluster lengths designed for retention of high frequencies do not completely suppress long wavelength horizontal noise. Long wavelength horizontal noise is further suppressed, without loss of the high frequency, by adding more clusters.

For example, if the cluster length required for retaining a given high frequency is limited to 150 feet, and if the longest wavelength noise to be suppressed is 750 feet, 5 clusters are used in the source point. Therefore, according to the preferred embodiment, $\Delta x$ is kept short enough to retain energy at the maximum frequency specified, and the number of clusters are set so as to suppress horizontal noise, i.e., the sum of cluster lengths for a source point is set at about the wavelength of the longest wavelength noise to be suppressed. Optimum results occur when the sum of the cluster lengths within the source point is kept equal to or greater than the length of the longest wavelength noise desired to be suppressed. Design criterion in practice will make the sum of cluster lengths no less than one-half of the longest noise wavelength and not more than twice this length. Exact specification of the sum of cluster lengths is not solely a function of technological concern for suppressing long wavelength noise to a specified level while retaining specified high frequency signal components to a specified level. It is also a function of economic factors imposed on the design, as well as the degree to which the long wavelength noise detrimentally affects the desired signal with which it interferes. From a purely technological criterion, the desired sum of cluster lengths is always equal to or greater than the longest wavelength noise encountered, with allowance for an increase in this value when the source clusters are laterally offset from the receiver cable so as to foreshorten the effective cluster and geophone group lengths (due to the difference in angle of arrival of this horizontal noise and the array directions in such a case).

Referring to the example embodiment of FIG. 5, to suppress horizontal noise, the cluster lengths (CL) are set such that the sum of all cluster lengths at any source point (for example 4CL for the source point seen in FIG. 5) is approximately equal to the longest expected wavelength of the horizontal noise. Increasing the individual cluster lengths detrimentally affects high frequency response. Shortening the length of each cluster increases high frequency response.

According to another embodiment of the invention, long wavelength horizontal noise is suppressed by adhering to a particular criteria for designing the field acquisition geometry and the manner in which the resulting data is processed. The description of this criteria is described with reference to FIG. 5A. By way of overall description of the field design and subsequent processing steps, the diagrams of FIGS. 5A–5E represent a schematic representation, using example parameters, of each step and the relationship between the steps.

Referring now to FIG. 5A, a series of traces ta1–ta49 are seen, which correspond to signals received at receiver groups rg1–rg49 from source cluster A. FIG. 5B shows traces tb1–tb49, which correspond to signals received at receiver groups rg1–rg49 from source cluster B. FIG. 5C shows traces tc1–tc49, corresponding to signals received at receiver groups rg1–rg49 from source cluster C. The source clusters A–C are spaced at distances cl (as in FIG. 5) equal to the receiver group interval (ri of FIG. 5). It should be noted that the choice of three clusters is merely representative. Also, according to one embodiment, when the traces ta1–ta49, tb1–tb49, and tc1–tc49 are recorded, the active geophone groups are equally divided on either side of the cluster center. According to an alternative embodiment, the active geophone groups are unequally divided on either side.

Figure 5D:
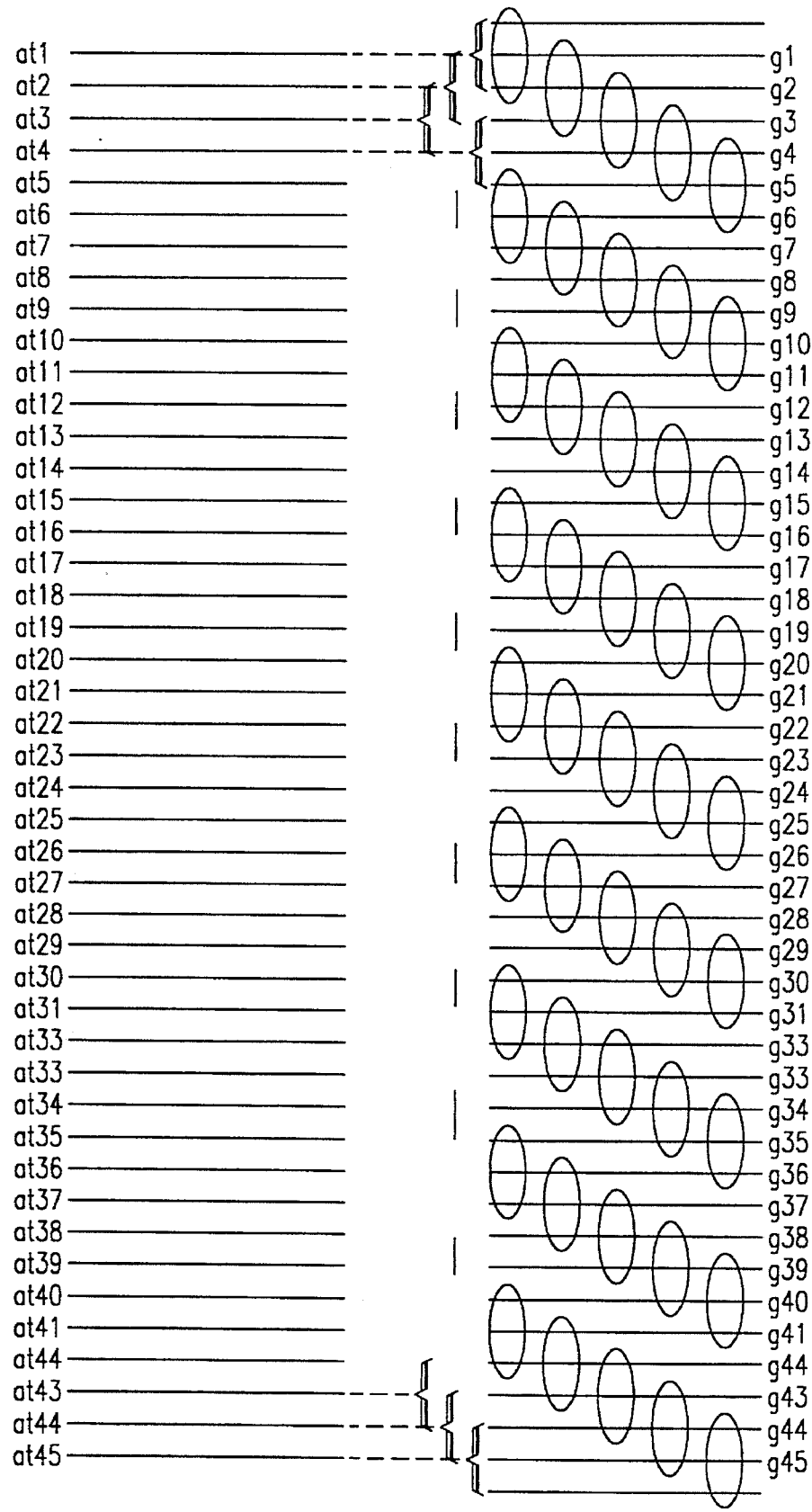
FIG. 5D is a trace record from combinations of traces from FIGS. 5A–5C.

It is apparent that among the traces ta1–ta49, tb1–tb49, and tc1–tc49, there are traces with common mid-points (for example, traces tc1, tb2, and ta3 have a common mid-point, as do traces tc2, tb3, and ta4, and as do traces tc3, tb4, and ta5). Referring to FIG. 5D, according to this embodiment, those traces having a common mid-point are grouped into gathers g1–g45, wherein, for example, gather g1 comprises traces tc1, tb2, and ta3, gather g2 comprises traces tc2, tb3, and ta4, gather g3 comprises traces tc3, tb4, and ta5, etc. Each trace in a gather is synchronized (for example with normal moveout correction according to hyperbolic moveout correction functions) with every other trace in the same gather; and, then, the synchronized traces are added to every other trace in the same gather, resulting in an added trace for that gather. For example, the added trace for gather g1 is seen in FIG. 5D as added trace at1; the added trace for gather g2 is seen in FIG. 5E as at2; and added traces at3–at45 correspond to gathers 3–4, respectively.

Figure 5E:
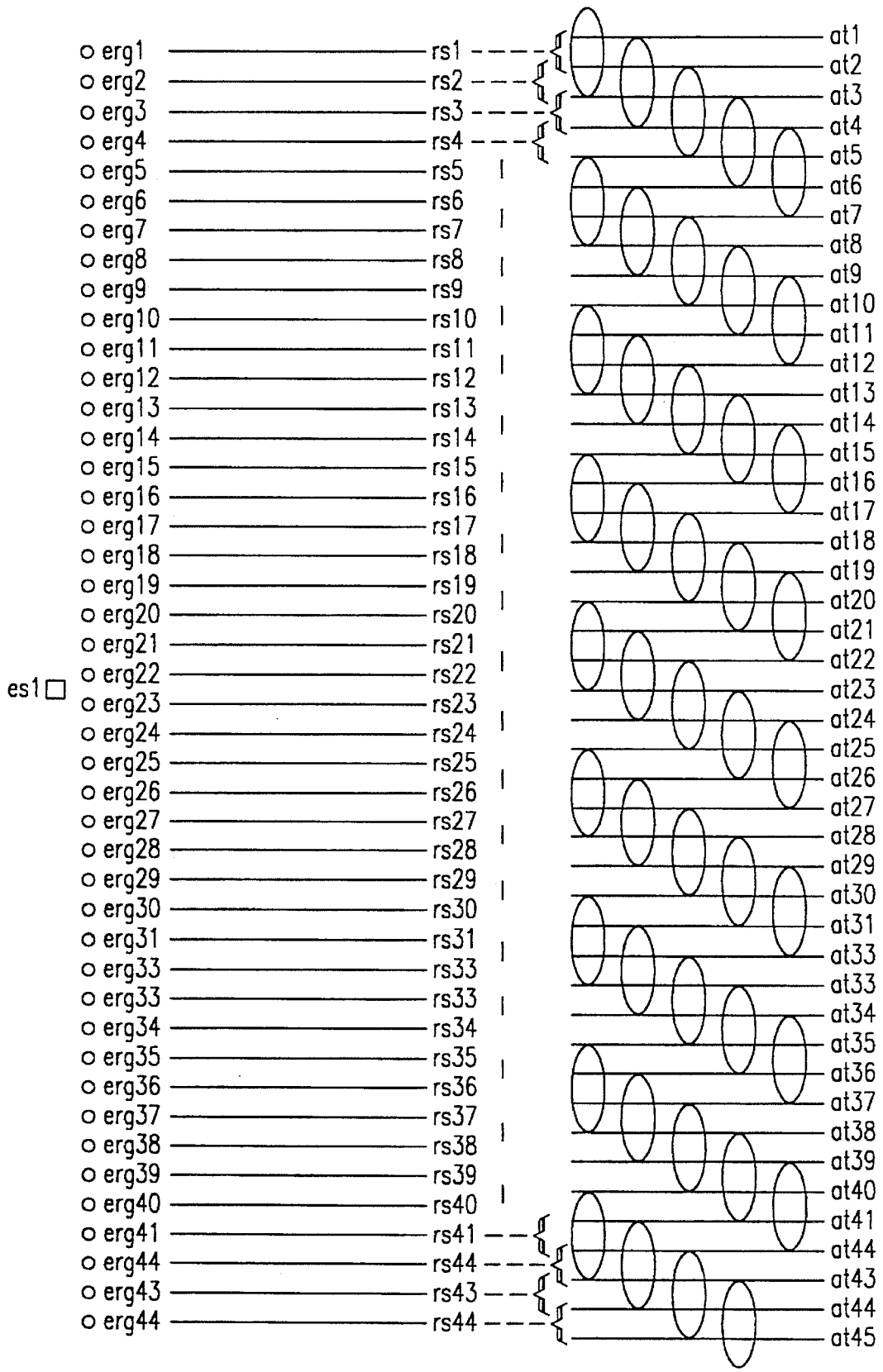
FIG. 5E is an equivalent record of traces from FIGS. 5A–5D.

The added traces at1–at45 are then further added in a manner called a "running sum", which, referring still to FIG. 5E, is applied as follows. Each of traces at1–at45 is added to the proximate trace, resulting in running sum traces rs1–rs44 (for example, the sum of added traces at1 and at2 is running sum trace rs1; the sum of added traces at2 and at3 is running sum rs2; and so on). According to the embodiment of FIG. 5E, the running sum is called a "two trace running sum." The result of the running sum is a set of traces rs1–rs44 that is the equivalent of a field record of traces recorded at equivalent receiver groups erg1–erg44 from equivalent source es1.

The effect of the process just described is to combine the recorded signals from a source point, comprised of several source clusters, such that a new equivalent record is generated, having fewer traces than the original records from each individual source cluster, but with an improved seismic signal strength relative to noise, and with the horizontal noise suppressed with wavelengths equal or less than some specified long wavelength. These equivalent records are then used, as described in a still further embodiment, to develop a superior seismic section for interpretation of subsurface geology. To most effectively accomplish long wavelength noise suppression in embodiments like that discussed with reference to FIGS. 5A–5E, where L is the longest wavelength noise to be suppressed, the following formulas are used:

$$n = (2m)/q \quad (1)$$

$$L/d = 2mk + (q/2) \quad (2)$$

Where:

n is the integer representing the number of traces in the running sum, m is an integer that represents the number of receiver group intervals, is an integer representing the larger of the length of the receiver group or the length of the source cluster, expressed in units of receiver group intervals, d is the receiver group interval, and k is the number of source clusters in a source point.

It is seen that through practice of the present invention optimum noise suppression and high frequency signal retention are achieved. Such optimization is not possible with the prior art, which does not synchronize and additively combine only those source signals having very close ray paths.

Unlike in the common reflection point horizontal stacking of the prior art, signals in the common reflection-point gathers of the present invention are from relatively close source element locations and equivalently close receiver element locations, thus limiting the range of offset and not using source and receiver points representing a very much larger offset range.

Figure 6:
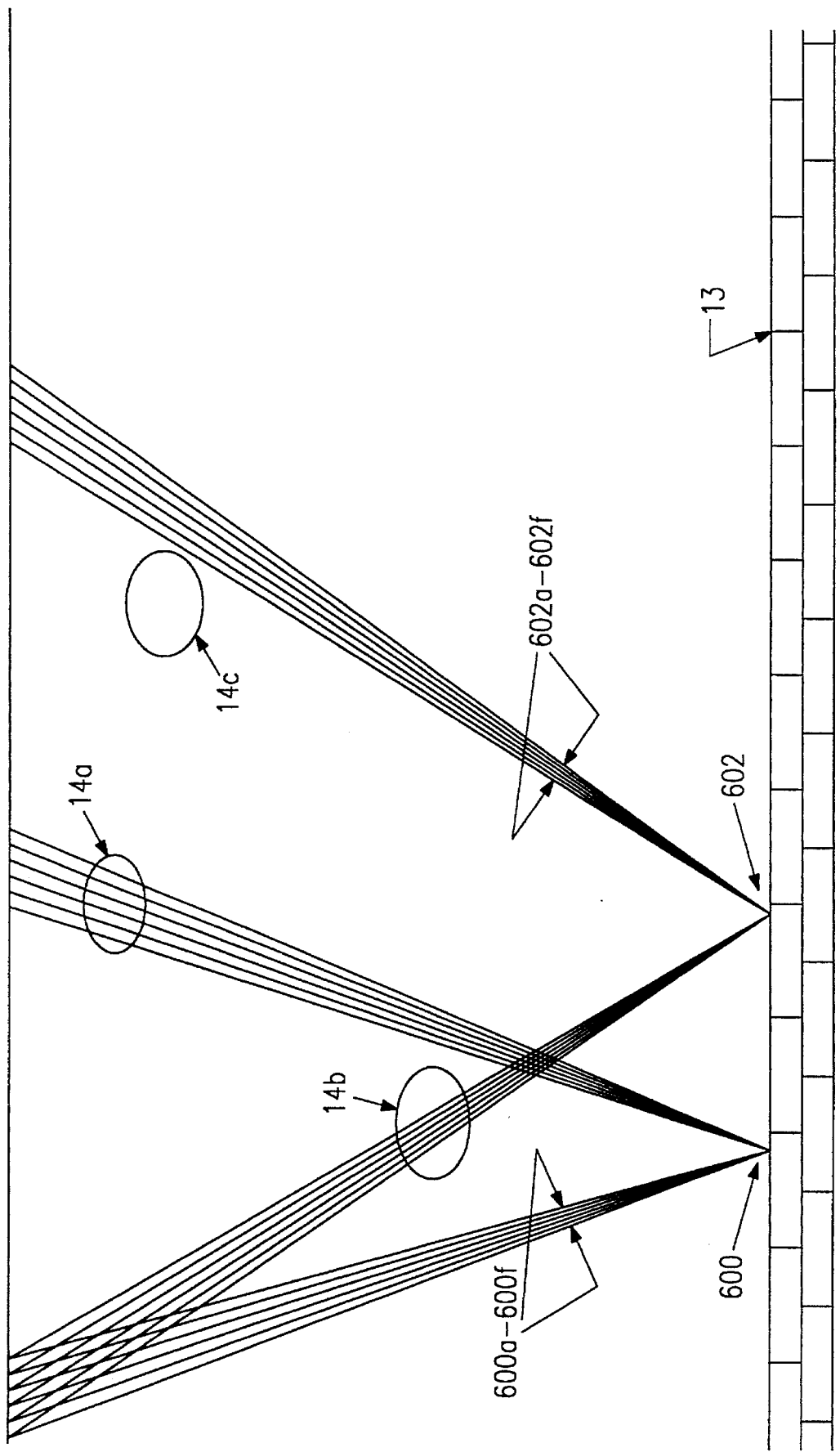
FIG. 6 is a ray path diagram of common reflection point gathers used according to one embodiment of the invention.

For example, FIG. 6 shows two reflection points 600 and 602. Cluster signal ray paths 600a–600f represent the total signals in the common reflection point gather for reflection point 600, and cluster signal ray paths 602a–602f represent the total cluster signals in the common reflection point gather for reflection point 602. Comparison with FIG. 1 (which shows source point signals in a common reflection point for a prior art common reflection point system), shows that the range of offsets and the number of cluster signals to be synchronized and added in FIG. 6 are both substantially less than for the source point signals that would have to be synchronized and added in the prior art system.

A substantial benefit of the present invention is seen in that the ray paths for cluster signals 600a–600f and 602a–602f, pass through a narrow volume of the geologic strata. Therefore, the chances increase that geologic anomalies 14a–14c (which cause velocity and timing anomalies in seismic signals) will be equally present in most, if not all, of the signals 600a–600f and 602a–602f. Such a condition results in two benefits. First, the moveout correction error in each gather, in comparison to prior art methods, is greatly reduced, thus greatly reducing the effects of errors in making moveout corrections. Second, in the event of inaccurate static time corrections during processing, the interpreter of the data is able to identify the cause or source of static time errors prior to interpretation of the data, a result that cannot be achieved according to the prior art system of FIG. 1. Redundancy is still preserved, however, because each cluster signal 600a–600f and 602a–602f represents the addition of many non-synchronized seismic signals imparted from multiple, closely-spaced source element locations within each source point (as described above) and received by receiver groups that are very close to each other (as described above).

Figure 7:
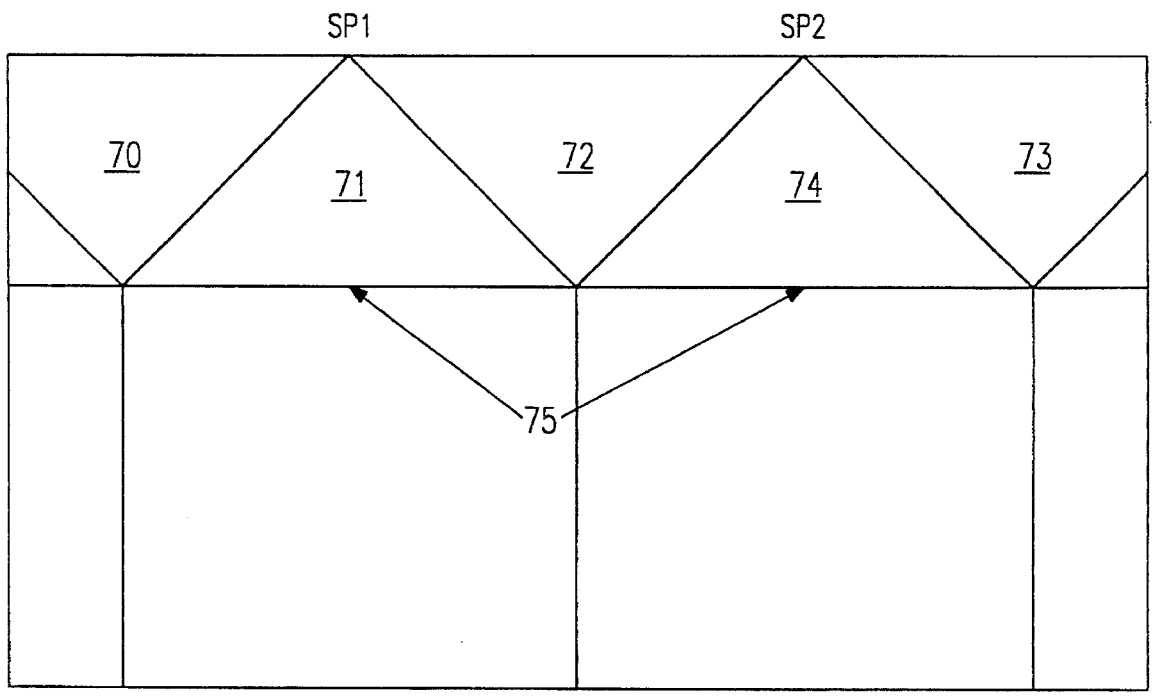
FIGS. 7–9 are coverage diagrams showing a variety of coverage patterns found in using various embodiments of the invention.

FIG. 7 shows a typical schematic of assembled processed records using the method of this invention. The vertical axis represents elapsed time from the source instant, with the top being zero time, and the horizontal axis represents distance along the seismic profile. Reflections are visible in the areas of reflection zones 71 and 74, and no data is seen in the mute areas 70, 72, and 73. Time level 75 represents the earliest reflection time (shallowest level) of continuous coverage for the above-described procedure with source points SP1 and SP2 (see FIG. 3).

Figure 8:
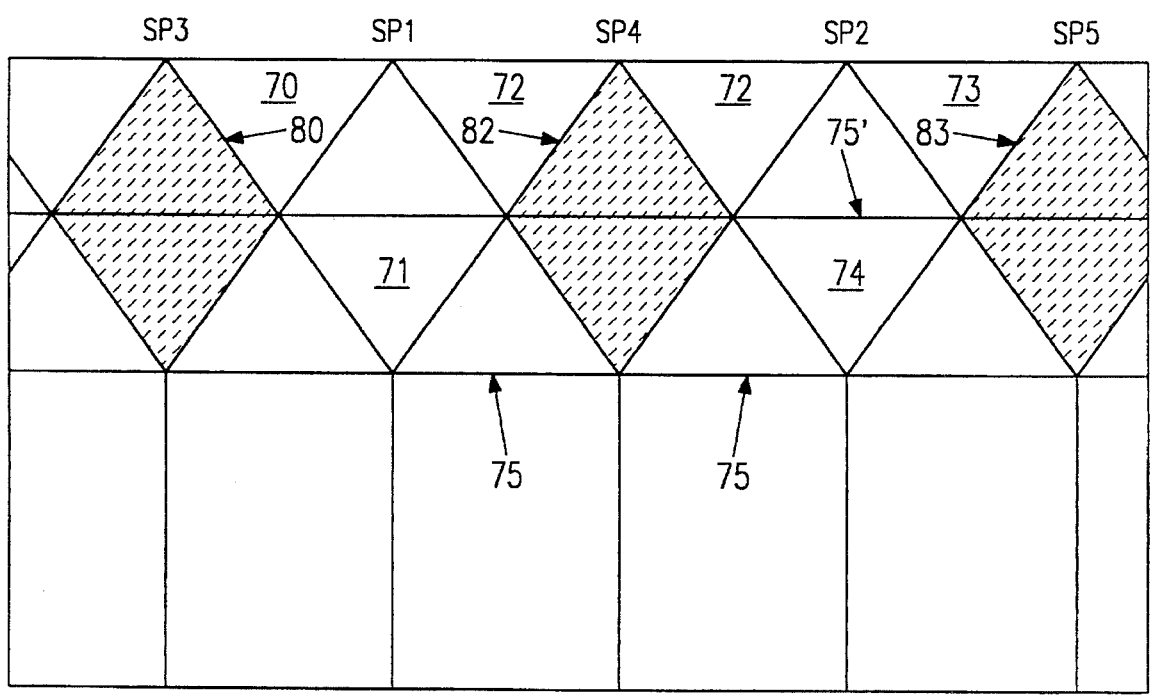

Referring now to FIG. 8, a further embodiment of the invention will be described in which cross-hatched portions 80, 82, and 83 of mute zones 70, 72, and 73 (FIG. 7) will be filled with data. According to such an embodiment, additional source points SP3, SP4, and SP5 are used between source points SP1 and SP2. Because the mute zones 70, 72, and 73 comprise reflection regions from shallow beds, less energy needs to be expended at SP3, SP4, and SP5 from any source cluster used directly above any of mute zones 70, 72, or 73 to receive the same quality data. Further, because the data will be received earlier than from the deeper zones below level 75, the signal-to-noise ratio will be improved. Accordingly, additional source points SP3, SP4, and SP5 are arranged between source points SP1 and SP2, and an abbreviated number of arrays of receiver points are used on each side, spanning at least to one-half the maximum offset used for SP1 and SP2. Less energy per source element location, and/or less source element locations per cluster are used at source points SP3–SP5, resulting in low cost acquisition of data for filling in reflection data for zones 80, 82, and 83. A new time level 75' of continuous coverage is thereby created, which is shallower than time level 75.

Figure 9:
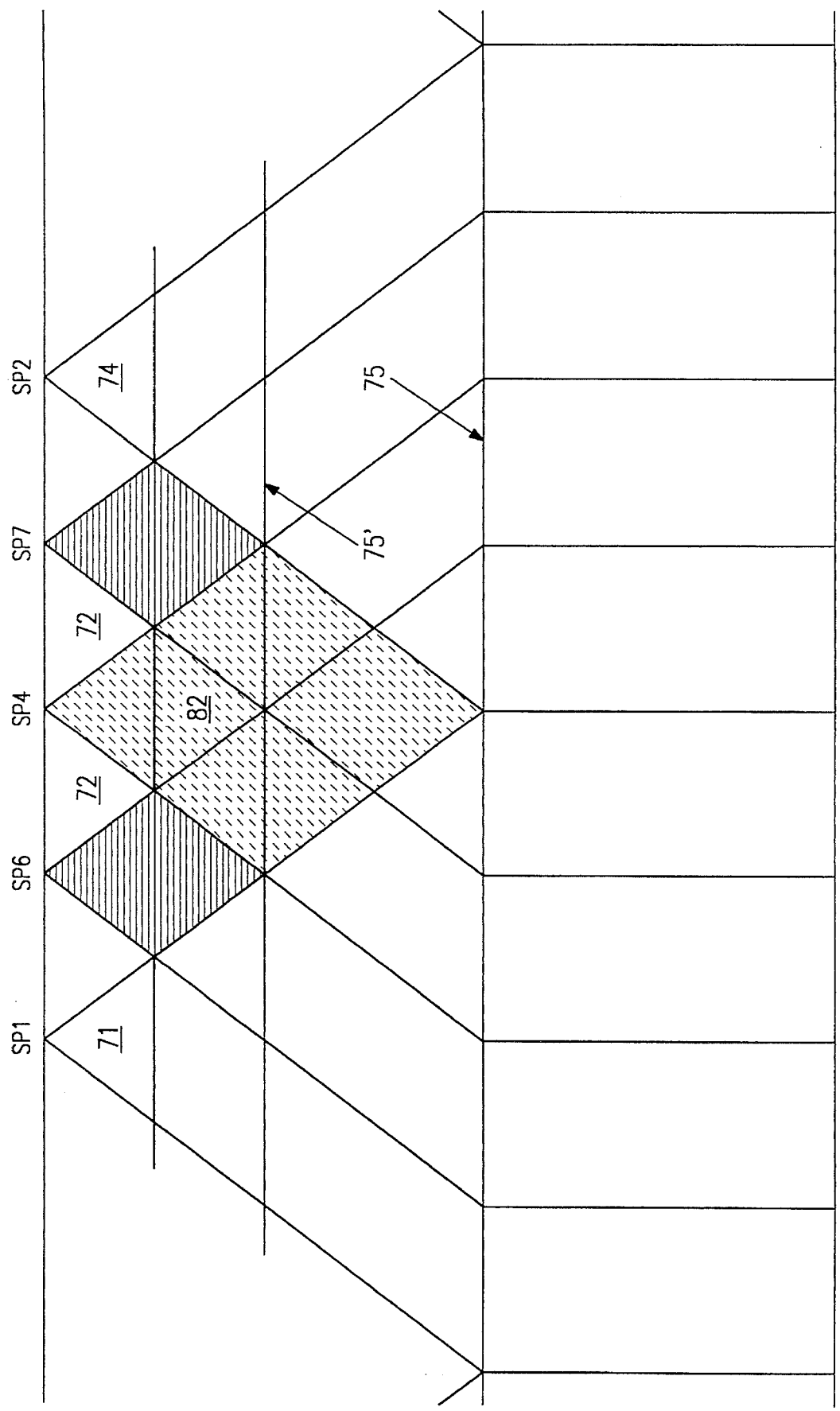
Figure 10:
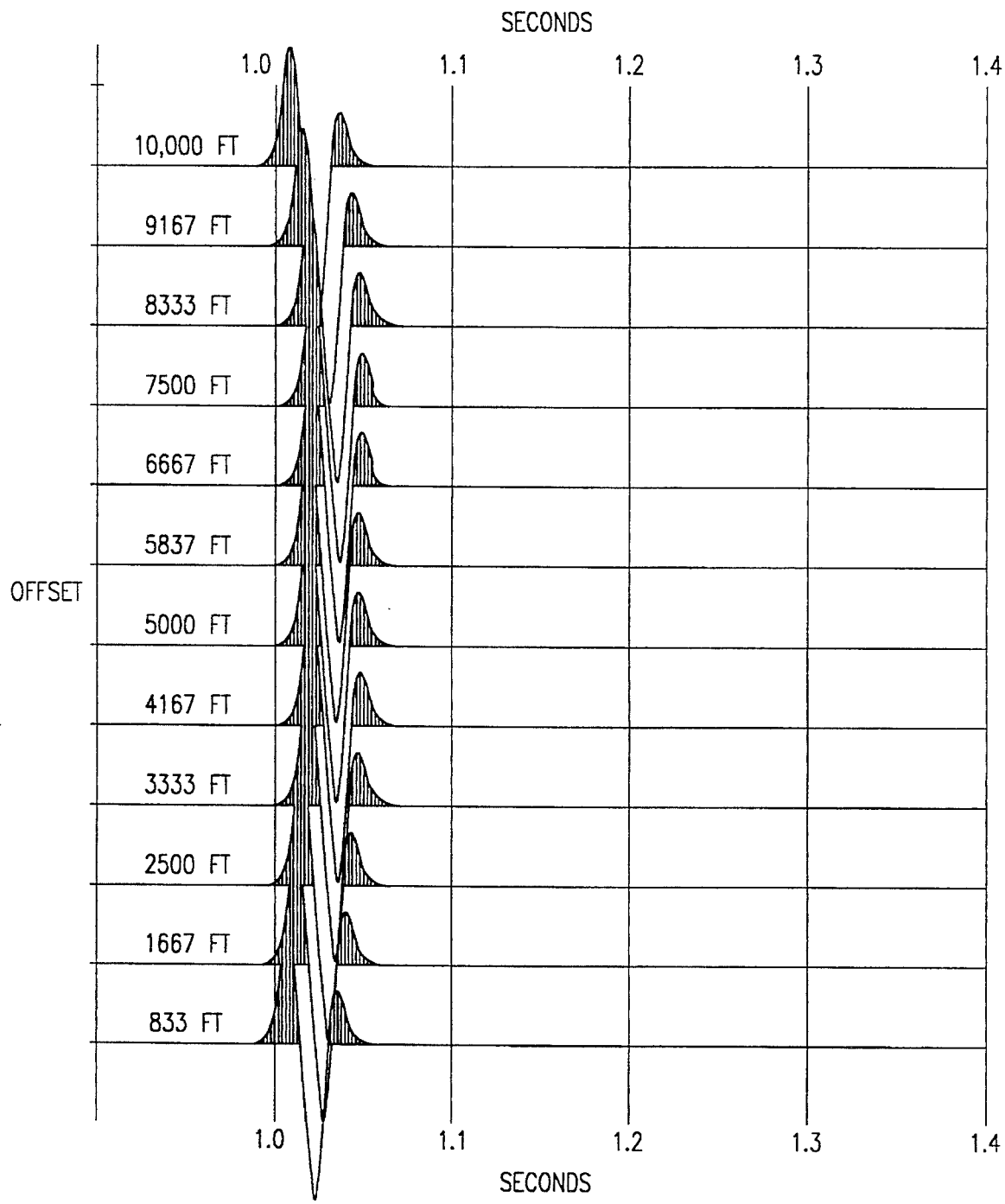
FIG. 10 shows correlative sequences of reflections from subsurface layers plotted against arrival time as a horizontal axis and horizontal distance between the source and receiver for each trace along the surface of the earth as a vertical axis showing an example of synchronized data with non-hyperbolic moveout.

Referring now to FIG. 9, the process described with reference to FIG. 8 is repeated to fill additional portions of mute zone 72 by using even less energy and/or source element locations at source points SP6 and SP7 (and even a lower number of receiver points per source point, equal at least to one-fourth the number used for SP1 and SP2). The design parameters for the energy needed and number of source element locations per cluster needed for the in-fill areas will be understood by those of skill in the art, after reading the above description of the process used in accordance with the invention for source points SP1 and SP2, depending on the topography and location.

The cost of acquiring nearly all land data is governed by the source point spacial density and level of effort at each source point. For example, in the case of vibrator sources, crew time, and thus crew costs, are a function of how fast the vibrators can cover the traverse assigned to the crew. In a typical prior-art, common reflection point effort, geophone groups are spaced 110 feet apart and source points every 220 feet. At each source point, four vibrators typically shake simultaneously for eight seconds each, and each typically have 10 source element locations from which to shake. Therefore, the index of energy effort, as well as time on the source point, is referred to as the "vibrator-sweep-seconds" (VSS). In the above example, there are 320 VSS (4×8×10) per source point. To cover one mile of traverse, there are 24 source points, and the total vibrator-sweep-seconds is 7,680 per mile. It should be noted that in the prior-art process, while multiple source element locations are used at each source point, multiple clusters are not used at each source point.

According to this embodiment of FIGS. 8 and 9, where multiple clusters are used at each source point and two in-fill efforts are made, each in-fill effort requiring ½ the VSS of the previous effort, the present invention covers the same mile using 3,840 VSS for the first pass (resulting in coverage as seen in FIG. 7), 1,920 VSS in the second pass (resulting in coverage seen in FIG. 8), and 960 VSS in the third pass (resulting in coverage seen in FIG. 9). Therefore, the total VSS per mile is 5,720 VSS with the present invention, as compared to 7,680 VSS using the prior art method. Further, higher quality data is achieved with less noise, higher frequency response, and better lateral resolution. Similar reduction in source point effort with sources other than the vibrators are realizable in the same manner. With dynamite sources, for example, the savings is in total quantity of explosive used and/or the number of holes to be drilled and loaded per mile of seismic profile.

According to another example of the use of the invention, where the in-filling described above is not used, only a 5,632 VSS effort is required per mile, where a 60-fold prior art common reflection point effort used 10,240 VSS per mile, and the present invention provided improved vertical and horizontal resolution over the prior art 60-fold common reflection point method.

The improvement in efficiency depends primarily on the shallowest level of desired continuous coverage, and to a lesser degree on topography and the nature of the geology to be mapped. It has been found that a large percentage of geological requirements have been met where only one level of in-filling, as described above, is conducted.

Advantages Of Common Reflection Point Processing

According to some of the above described embodiments, single-coverage is used, and the subsurface data for any particular source point beyond the half-way point between any two source points is ignored. According to such embodiments, source points are spaced as far as possible to still achieve continuous coverage for the most shallow depth of interest. Nevertheless, data received from the receivers beyond the half-way point between source points is still received. Such data can be used to solve problems that the prior art common reflection point method solved, without introducing the problems that the prior art introduced.

Examples of advantages that the prior art common reflection point method had that are not present in single coverage systems includes: (1) the ability to conduct AVO (Amplitude Variation with Offset) analysis, and (2) suppression of multiple reflections which have a different moveout curve than the primary reflections.

AVO

Figure 11:
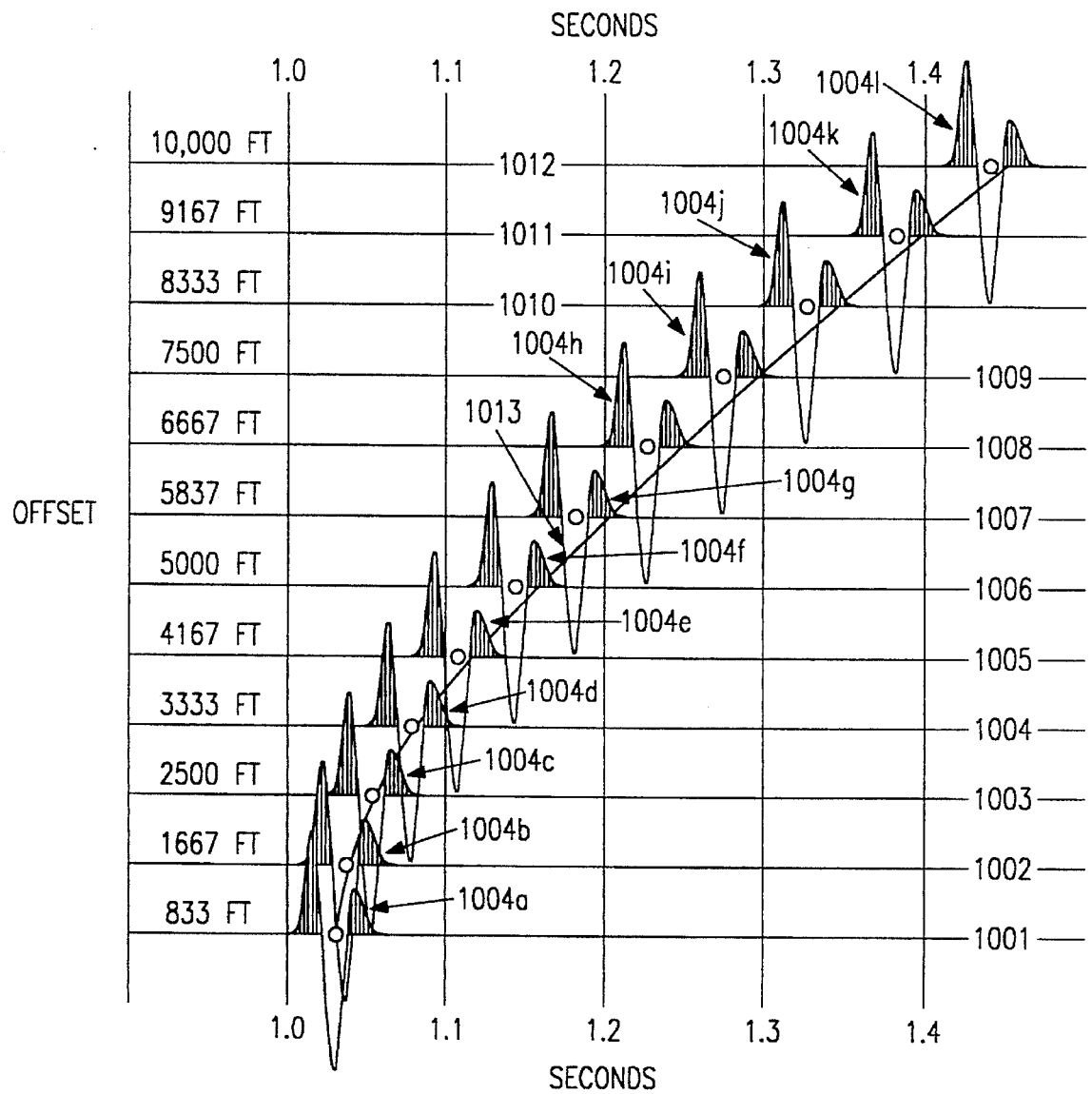
FIG. 11 shows a gather of traces having reflections from the same reflection point, but different arrival times, illustrating non-hyperbolic error.

In the prior art common reflection point method, the same reflection events seen on different individual traces for a particular common reflection point gather may have differing amplitudes, depending on the offset (distance) between the particular source and receiver pair from which the trace was obtained. Refer to FIG. 11. As the offset increases, the amplitude for a reflection from a shale, brine-filled sand interface, for example, will change with offset increase at a different rate than the amplitude for a reflection from a shale-gas sand interface, for example. Therefore, when a reflection is seen in the stacked record, which suggests hydrocarbon content in one of the rocks forming the reflection interface, interpreters might look at the corrected unstacked gather, as in FIG. 11, for that reflection to see how the amplitude changed with offset. Accordingly, in those embodiments of the invention wherein there are not multiple traces from the same reflection point, wherein the traces are from source-receiver pairs having largely differing offsets, the ability to conduct AVO analysis is reduced, or eliminated completely.

Suppression Of Multiple Reflections

One problem addressed by the synchronization of traces across an entire gather with vastly differing offsets is that of "multiple reflections" (i.e., those reflections that are received when a signal reflects from a shallow depth, travels back to the surface, then back to the same shallow depth, and then back to a surface geophone, looking like an event from a greater depth than that from which the primary reflection actually occurred). Such a phenomenon is understood by those of skill in the art. Because the rate at which the multiple reflections are delayed trace-to-trace as offset between the source-receiver pairs for the traces increases is a different rate than that for primary reflections, the prior art common reflection point method reduced multiple reflections by synchronization of primary reflections on traces having large differences in offset. The multiple reflections were thus left under-corrected and did not add well in the stack of common reflection point gathers.

Figure 1B:
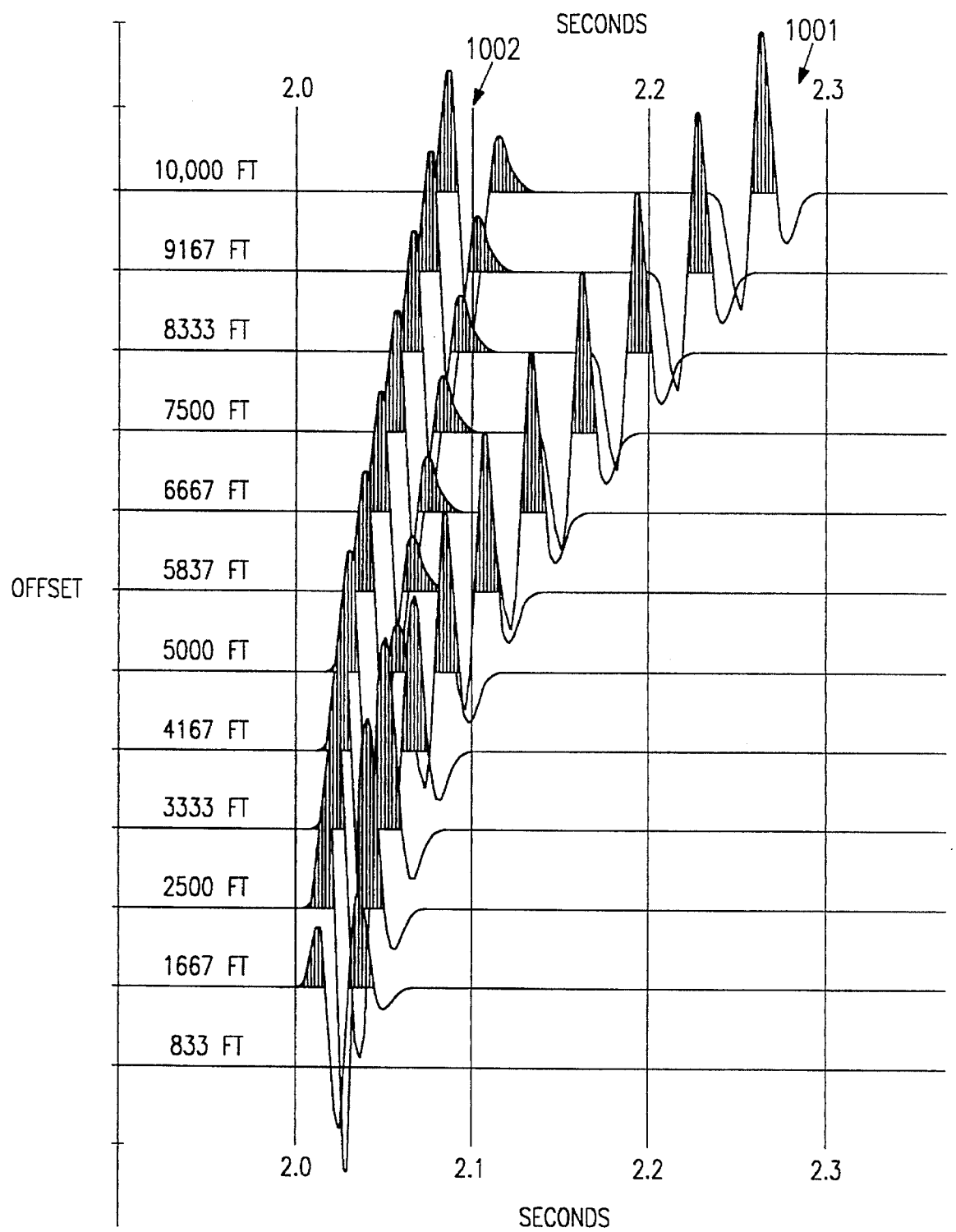
FIG. 1B shows correlative sequences of reflections from subsurface layers plotted against time of arrival as a vertical axis and horizontal distance between the source and receive for each trace along the surface of the earth.
Figure 1C:
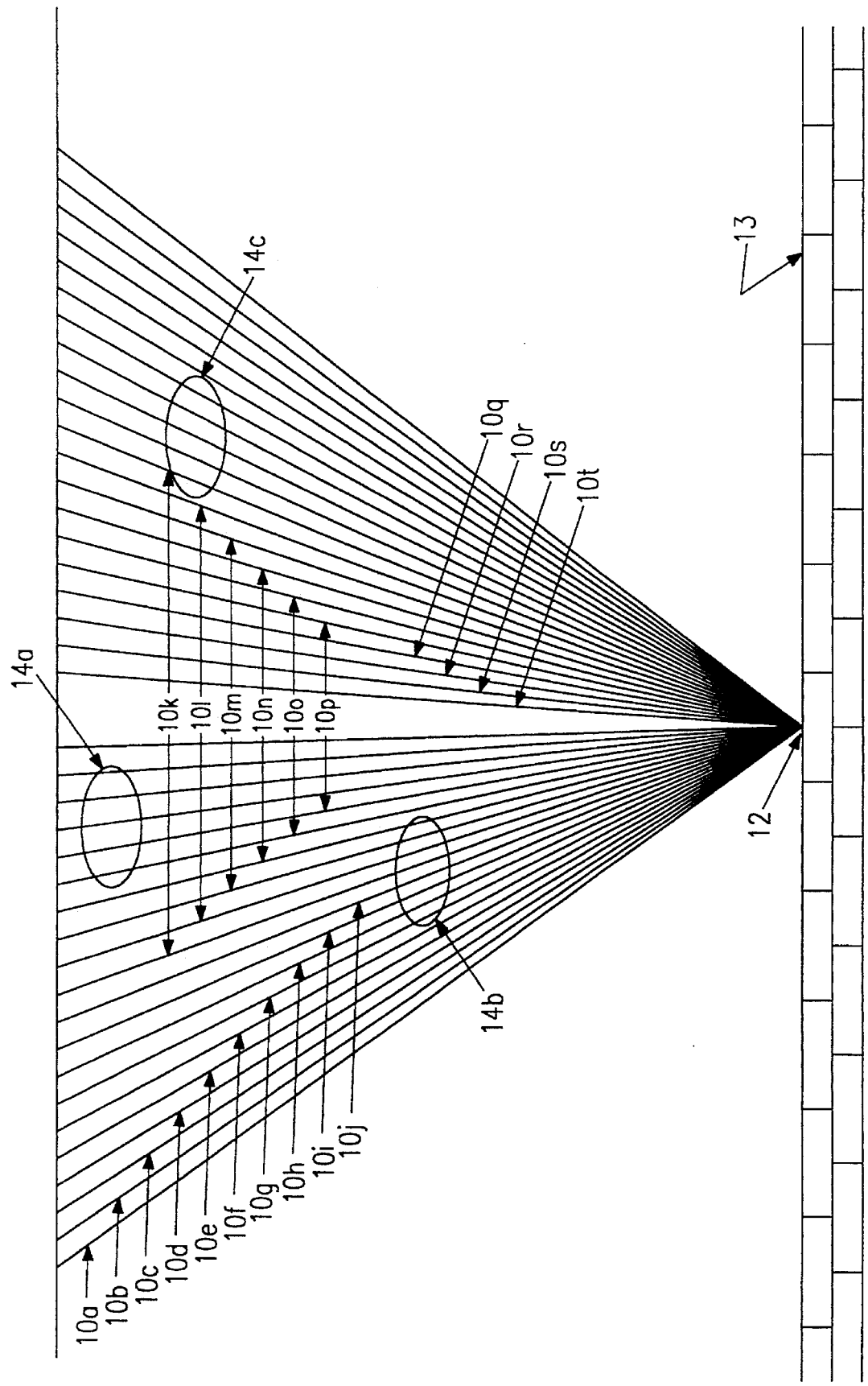
FIG. 1C shows an example set of ray paths which are synchronized and then added according to a prior art method of seismic data gathering.
Figure 1D:
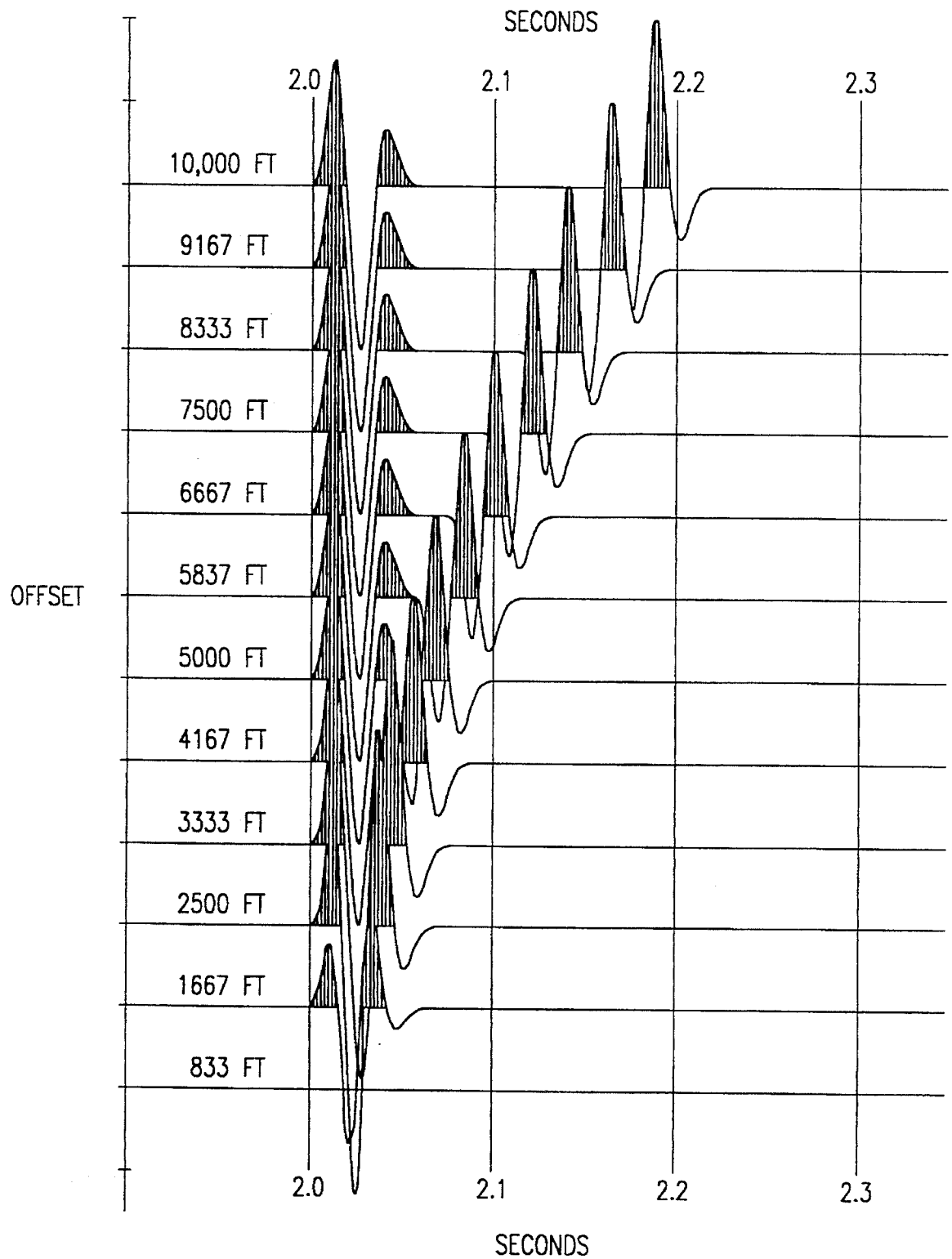
FIG. 1D shows a moveout corrected gather, taken from the gather of FIG. 1B.
Figure 1E:
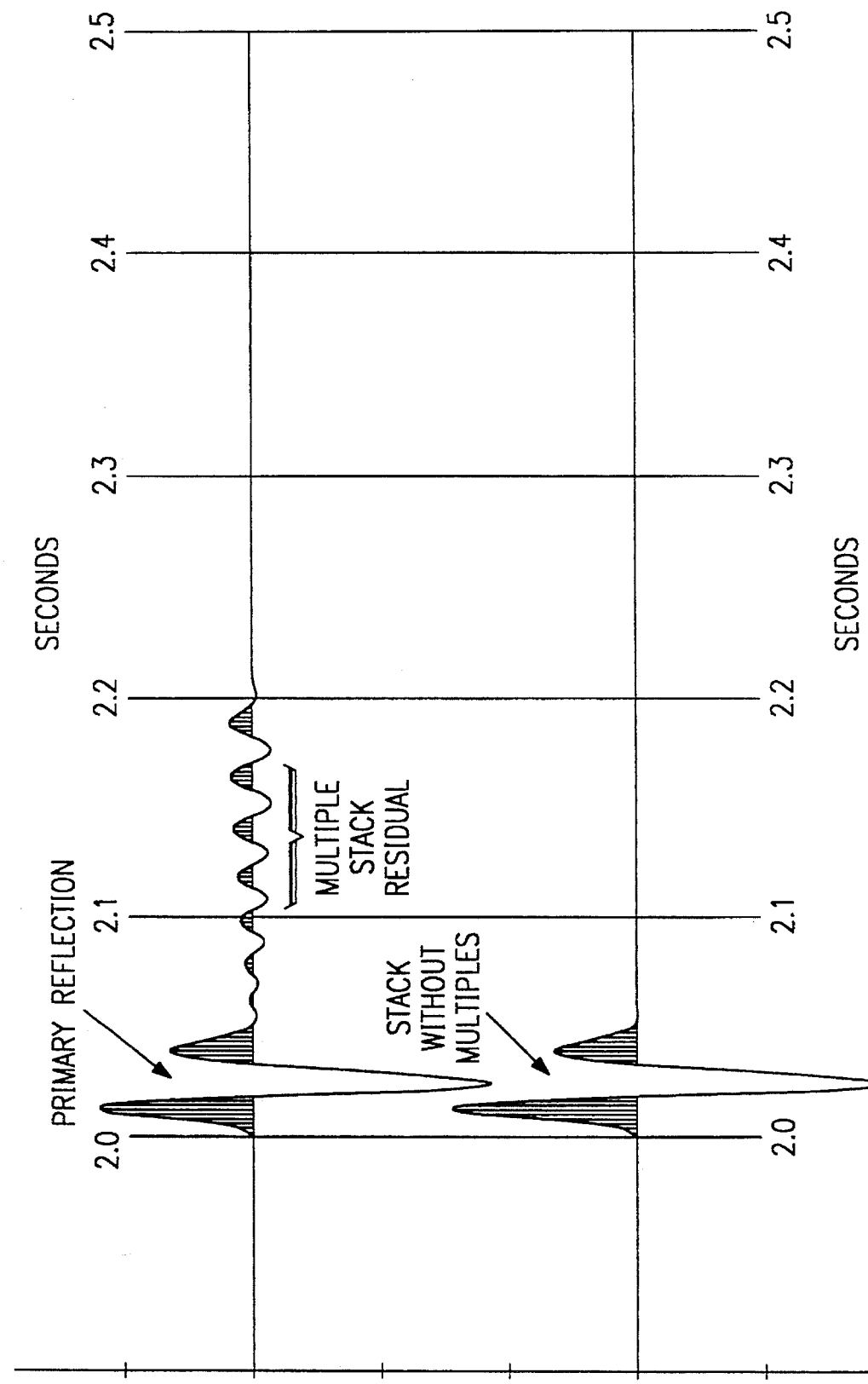
FIG. 1E shows a comparison of stacked data containing multiple reflections with stack data containing no multiple reflections.

For example, referring to FIG. 1B, a set of multiple reflections as seen in a common depth point gather for a reflection point at 5,000 feet depth are seen labeled along a hyperbolic curve 1001, and the primary reflections for the same gather are seen along a different hyperbolic curve 1002. Synchronization over the entire gather using hyperbolic curve 1002 substantially aligns the primary reflections as seen in FIG. 1D, subject to the inherent error discussed above. But such synchronization mis-aligns the multiple reflections, as seen in FIG. 1D. Accordingly, when the synchronized traces are added, the amplitude of the aligned primary reflections are added, and the mis-aligned multiple reflections are not, as seen in FIG. 1E.

Further Embodiments

An alternative embodiment of the invention allows for both AVO analysis and suppression of multiple reflections.

As explained above, synchronization (e.g., NMO) between traces received from multiple source receiver pairs that have widely differing offsets is inaccurate. Remember, in the prior art common reflection point method, the synchronization occurs between several traces, some of which come from source-receiver pairs that are not far apart (i.e., there is a small offset), and some of which come from source-receiver pairs that are far apart (i.e., there is a large offset). Further, the prior art method assumes that the time delay is a hyperbolic function of the distance between the source and the receiver for a particular pair. In other words, as the offset between the source and receiver increases, the time delay for a reflection to be received from a particular reflection point is presumed to increase hyperbolically. This assumption is incorrect.

Figure 11A:
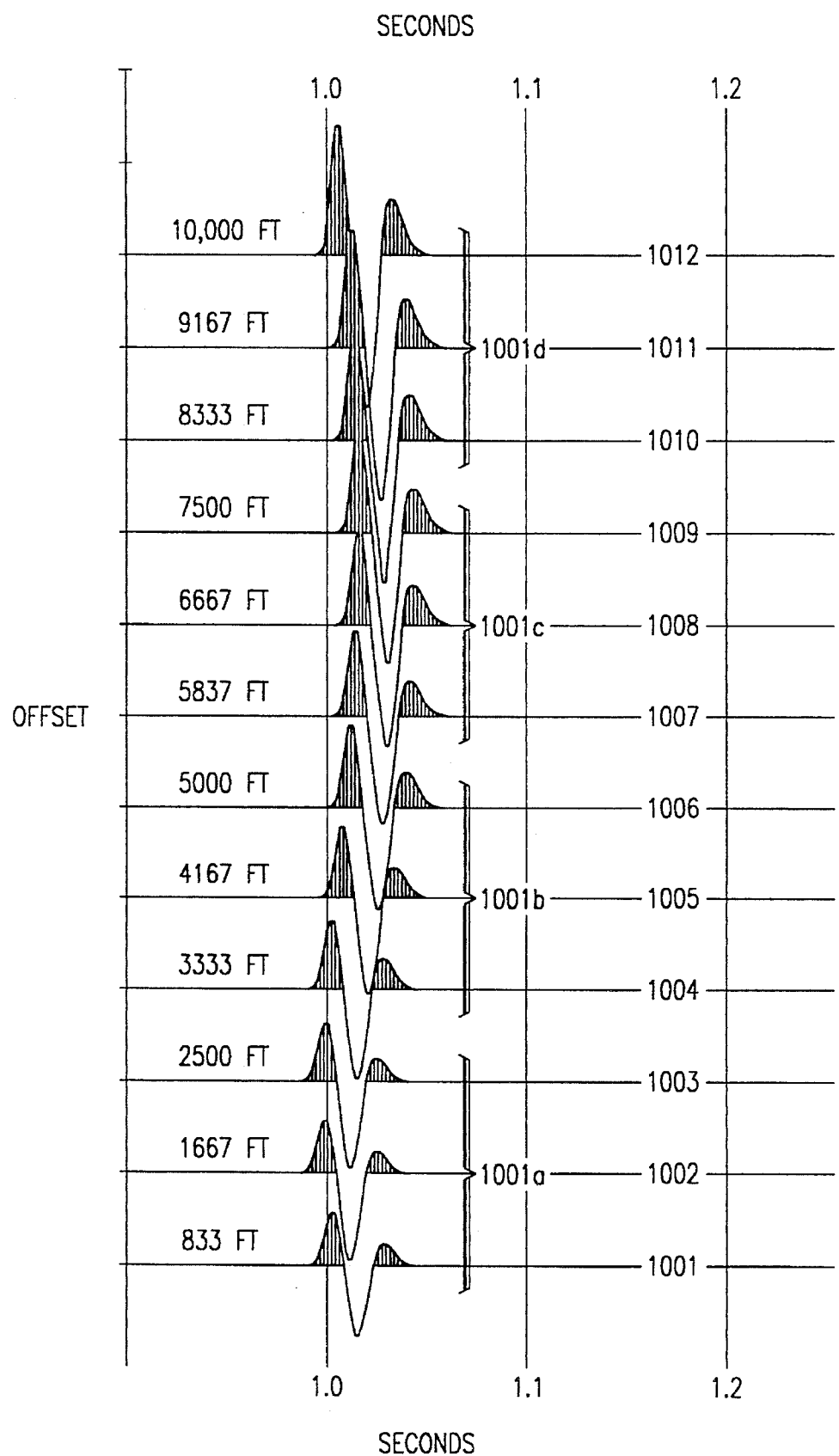
FIG. 11A shows the gather of FIG. 11, moveout corrected according to a hyperbolic function, and with amplitude variation with offset.

Referring now to FIG. 11, a gather of traces 1001–1012 having a common mid-point is seen in FIG. 11, wherein trace 1001 is from a source-receiver pair having an offset of 833 feet, and trace 1012 is from a different source-receiver pair having an offset of 10,000 feet. It can be seen that the reflections 1004a–1004l from a given depth (5,000 feet) are not delayed by the exact amount predicted by the hyperbolic function 1013. Synchronization presuming hyperbolic delay for the entire group of traces 1001–1010 (i.e., "across the gather") introduces error, as shown in FIG. 11A, wherein traces 1001–1012 are not aligned.

Therefore, according to one embodiment of the invention, synchronization is not conducted between traces from source-receiver pairs having vastly differing offsets. Synchronization is conducted between traces having similar offsets. Accordingly, the errors in the hyperbolic model are not as critical, because over short changes in the offsets between the source and receiver the hyperbolic model is fairly accurate. Hereafter, this embodiment may be referred to as limited offset stacking.

It should be noted that according to the limited offset stacking embodiment of the invention, the preferred layout of the sources and receivers will suppress horizontal noise in the manner described by Anstey. However, this embodiment is also practiced, with surprisingly beneficial results, with data collected according to prior art common reflection point methods, even those that fail to use the published Anstey stack array method.

Figure 11C:
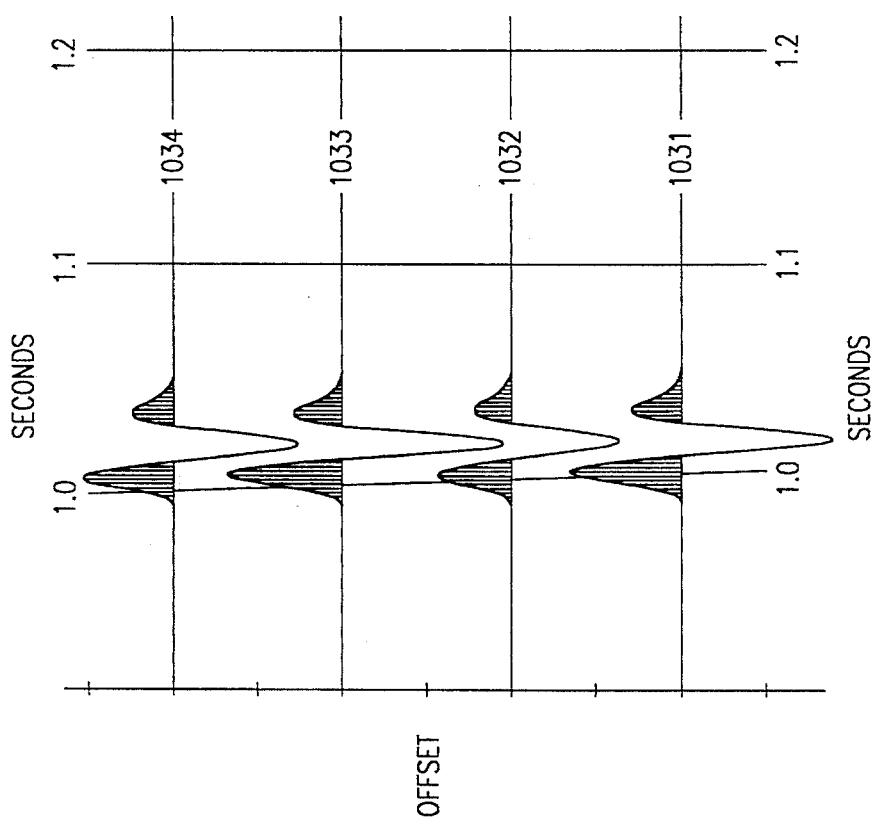
FIG. 11C shows alignment results of traces from FIG. 11B after one step of one embodiment of the invention.
Figure 11B:
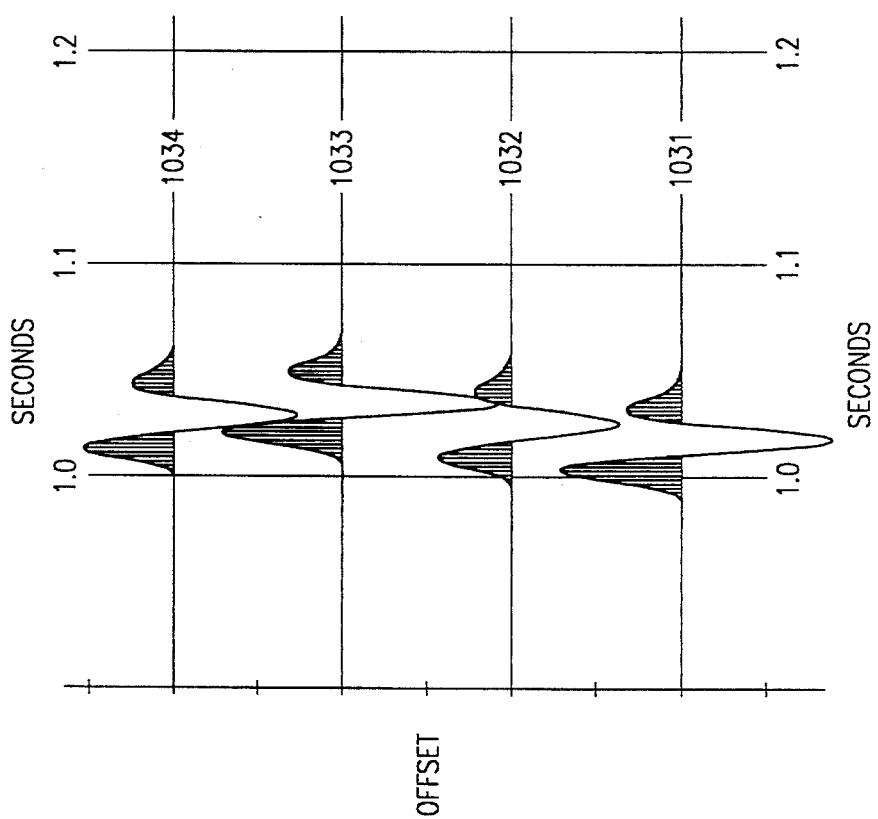
FIG. 11B shows alignment results of traces from FIG. 11A after one step of one embodiment of the invention.
Figure 11D:
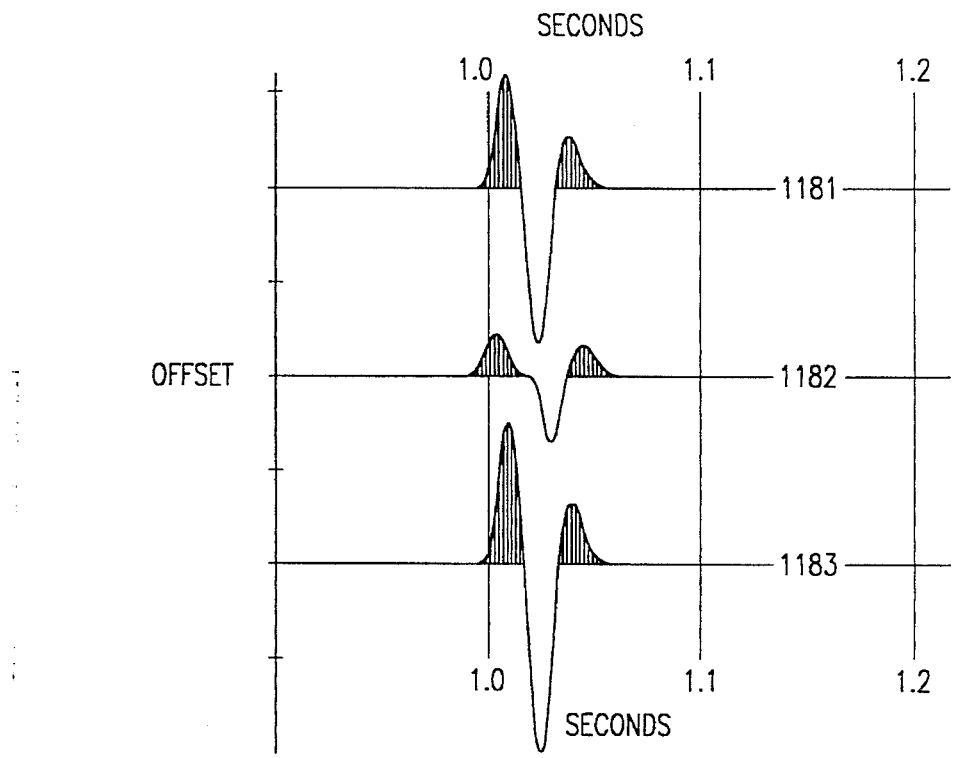
FIG. 11D is a graph illustrating a form of error in prior art methods.

Referring again to FIG. 11, an example of the limited offset stacking embodiment will be described. FIG. 11 shows a gather of traces 1001–1012, organized by offset whereby trace 1001 has the smallest offset and trace 1012 has the largest. An example of a process using the limited offset stacking embodiment is:

1. An initial moveout correction is made to traces 1001–1012 using the moveout equation, as in conventional data processing. The result is seen in FIG. 11A.
2. The seismic traces are sorted into "mini-gathers" using a predefined limit on the offset range (an acceptable method for determining the offset limit will be discussed below). For example, referring to FIG. 11A, four mini-gathers 1001a, 1001b, 1001c, and 1001d are defined comprising traces 1001–1003, 1004–1006, 1007–1009, and 1010–1012, respectively.
3. The four mini-gathers are individually added, thus defining added traces, one added trace for every four original traces 1001–1012. FIG. 11B shows the resulting new set of traces 1031–1034. Traces 1031–1033 were added from traces 1001, 1002, 1003; 1004, 1005, 1006; 1007, 1008, 1009; and 1010, 1011, and 1012 of FIG. 11A, respectively.
4. Traces 1031–1034 are added with a variable timing correction designed to remap the reflections of each trace 1031–1034 into the sequence of reflections having the time position of a selected reference trace. (See FIG. 11C). The results of stacking 1031–1034 after such remapping is shown in FIG. 11D as trace 1181. Trace 1182 shows the error-laden result of adding the traces of FIG. 11A, and trace 1183 shows what a perfect stack should be, in theory. It is apparent that the present invention gives results which are superior and closer to the ideal than does the prior art. Such remapping will be described more fully below.

Figure 11E:
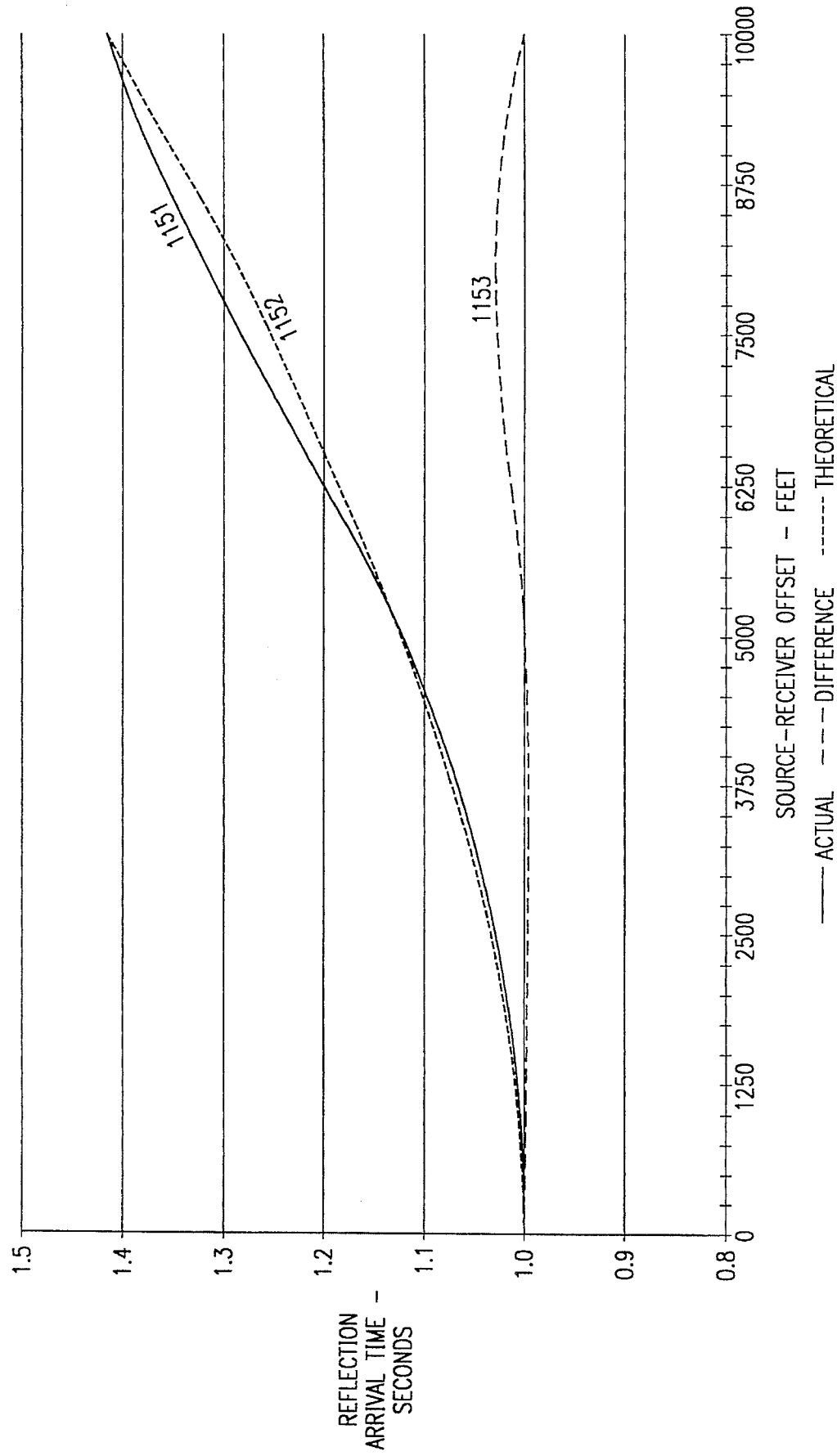
FIGS. 11E–11F are graphs illustrating a method of designing an embodiment of the present invention.

One advantage of using the above embodiment is illustrated in FIG. 11E, where curve 1151 is the time of arrival for a reflection event at 5,000 feet depth, and the velocity of propagation to 5,000 feet averages 10,000 feet per second. The zero offset time is one second and the time for an offset of 10,000 feet is approximately 1.414 seconds. Curve 1151, however, is not a true hyperbola, because the velocity between the source and receiver positions over the maximum offset of 10,000 feet varies.

If a hyperbolic moveout equation is used to estimate the moveout time curve, as in prior art data processing, it will follow the dotted curve 1152, which represents the values computed for correcting curve 1151. The result of this imperfect correction is the dashed curve 1153, which is seen wavering about the correct time of 1.0 second as offset varies. Synchronizing and adding data with the timing register of dashed curve 1153 is the prior art practice, resulting in the loss of high frequencies and thus resolving power. But, it has been found that if traces are synchronized over limited offset ranges, the time difference within these limited ranges being less than for the entire set of offsets, high frequency data is retained.

Figure 11F:
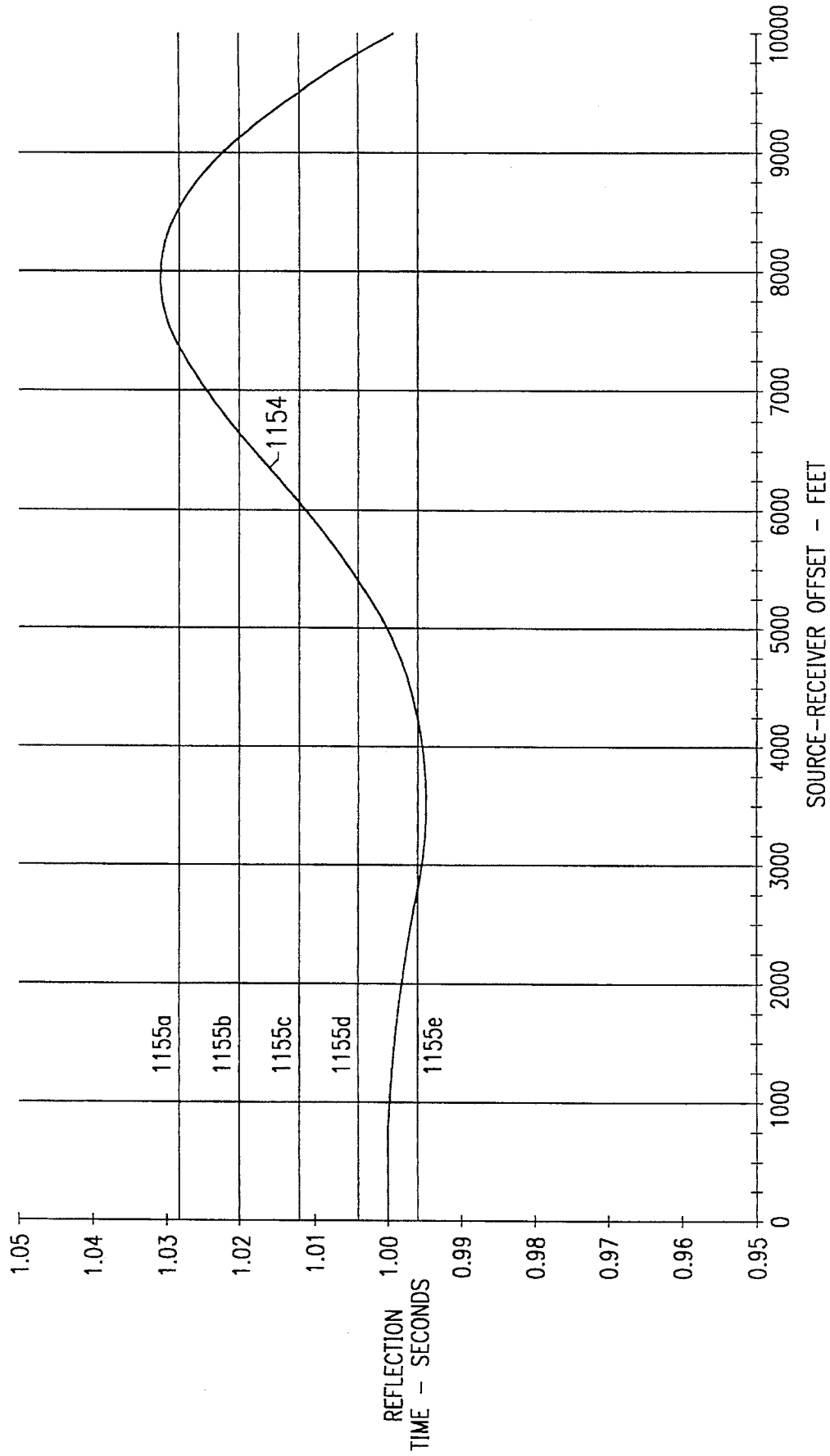

According to one embodiment, therefore, data is synchronized over a range of offsets determined by reference to FIG. 11F, wherein curve 1154 is the residual actual reflection arrival time after moveout correction as in FIG. 11E (curve 1153), but amplified for detail. Superimposed on curve 1154 (FIG. 11F) are several constant time lines 1155a–1155e of equal time separation. According to the illustrated example, the time separation is 8 milliseconds (0.008). For example, an 8 millisecond range of corrected time values before stacking is acceptable if preservation of data to about 65 Hz is required. If a higher frequency is required, less than 8 milliseconds would be used. The equation that governs this relationship is, $$f_{max} = 1/(2\Delta t)$$

where $f_{max}$ is the highest frequency to be preserved and at is the time separation.

Still referring to FIG. 11F, the range of offset allowable for this first stage stacking is that determined where the slope of the actual time curve 1154 is steepest, here at the farthest offsets, 9,500–10,000 feet. If the velocity variation had been some other function with lateral distance along the profile, the offset position for greatest rate of change would be some other value. From FIG. 11F, it is apparent that synchronization of traces having differences in offsets of about 400 feet, determined at 9,500 ft. of offset, will preserve frequencies up to about 65 Hz, in this example.

Referring now to FIG. 11G, an alternative embodiment is illustrated showing how the offset range for the mini-stacks is determined. Curves 1161–1163 represent the difference in time (Δt) over various offset ranges. The solid line 1161 corresponds to an offset range of 750 feet. The lines 1162–1163 correspond to ranges of 1,000 and 1,250 feet, respectively. For the 750 foot range, the data in the far offset region exhibits values of 12 milliseconds of misalignment, corresponding to a frequency of about 42 Hz for the upper limit for stacking such data.

According to yet a further example of the limited offset stacking embodiment, assume a sequence of seismic stations numbered from 101 to 200 for a given acquisition profile. A source is exercised at each of these stations and a geophone group is recorded as well. Records are limited to the nearest six stations on either side of each source. Thus, a 12 channel system is operated with a source interval equal to the receiver interval.

Adopting a convention that aaa/bbb represents a source point (aaa) recorded by a receiver point (bbb), we may start our two stage process with source positions 106 and 107. The limited offset range gather will use only two stations of range. Thus a first record is formed as follows: 107/101, 106/102; 107/102, 106/103; 107/103, 106/104; 107/104, 106/105; 107/105, 106/106; 107/106, 106/107; .... ; 107/111, 106/112. Note that exactly 12 stacked traces result from this step, each the sum of two original traces. These traces have receiver average positions at 101.5, 102.5, 103.5, .... , 109.5, 110.5, and 111.5. The average source position is 106.5. Thus, there is defined an eleven trace split spread record with the center trace at the source point average position.

Next, a similar record is formed using source positions 107 and 108. This second record will have eleven traces with average receiver positions 102.5–112.5 and the source average position will be 107.5. The end result of this first stacking step will be a sequence of records, 11 traces each.

The second step is to form the second stage CMP. Next, gathers are formed from these second stage records as follows: 106.5/111.5; 107.5/110.5; 108.5/109.5; 109.5/108.5; 110.5/107.5; 111.5/106.5.

The reciprocal paths appear as in all split-spread CMP sorting. The actual original traces by source/receiver locations that appear in this second gather are as follows:

| New Source/Receiver | Original Source(s)/Receiver(s) |
| --- | --- |
| 106.5/111.5 | 106/112, 107/111 |
| 107.5/110.5 | 107/111, 108,110 |
| 108.5/109.5 | 108/110, 109/109 |
| 109.5/108.5 | 110/108, 109/109 |
| 110.5/107.5 | 111/107, 110/108 |
| 111.5/106.5 | 112/106, 111/107 |

Long Offset Trace Alignment

It will be noted that after synchronization across limited offset traces is conducted, as described above, the non-hyperbolic moveout error still exists in the results as is seen in the example of FIG. 11B. According to a further embodiment, therefore, an additional process is used to remap all reflections in all traces to match those of a reference trace chosen for a final gather.

For example, after limited offset stacking, the result is a record as in FIG. 11B, where it is seen that traces 1031–1034 are not aligned. To align traces 1031–1034, a conformal mapping procedure is used (according to one embodiment). One acceptable conformal mapping procedure is provided by the Coren Process supplied by the Disco Seismic Processing package marketed by CongniSeis of Houston, Tex. Another example is described below.

Figure 12:
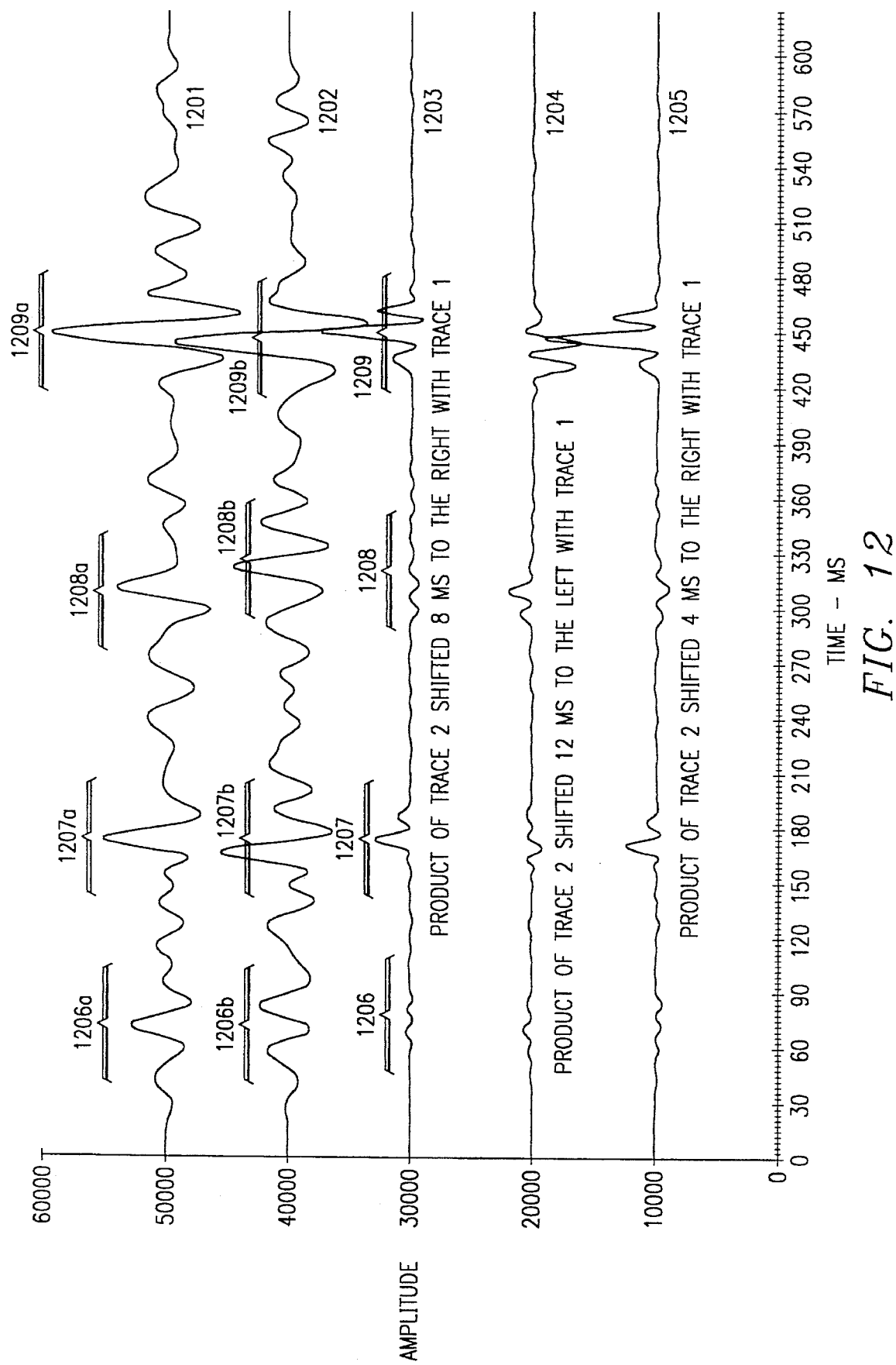
FIG. 12 is a graph of traces illustrating a conformal mapping procedure used according to one embodiment of the invention.

Referring now to FIG. 12 first, trace 1201 is made to be the "reference trace" (that is, the timing error will all be attributed to trace 1202). Trace 1202 is shifted earlier in time by some prescribed amount, for this example, 20 milliseconds, and then it is multiplied, point by point, with trace 1201. The choice of 20 milliseconds is made because, in this example, it is believed that no errors are as large as this amount. According to embodiments in which larger errors are predicted, a larger amount of initial shift is used. Three product traces 1203–1205 with different shifts are shown in FIG. 12. Product trace 1203 emphasizes wavelet complexes 1207 and 1209; product trace 1204 emphasizes complexes 1206 and 1209; product trace 1205 emphasizes complexes 1207 and 1209. Such emphasis occurs because the time shifts in each, cause one of wavelet complexes 1206a–1209a to be aligned with a corresponding complex 1206b–1209b.

Some product traces are seen to be negative (deflecting downward) in FIG. 12 rather than upward. Negative correlations signify anti-matching, or opposition in polarity between the reference trace 1201 and trace 1202. All negative values in the product traces are set to zero.

Next, each of product traces 1203–1205 is, after setting all negative values to zero, filtered with the envelope of the wavelet that generated trace 1201 or trace 1202 (they are assumed to be statistically alike). The result of such filtering is a filtered product trace that is saved.

Next, the shifting and filtering are repeated with one sample less shift for trace 1202, producing a different but somewhat similar filtered product trace, which is also saved.

The above process is repeated until a set of filtered product traces between trace 1201 and successively shifted trace 1202 are obtained. In this example, there are 21 filtered product traces since 10 ms. left shift is the beginning point, and the shift proceeds with 1 ms. shifts for each step, until trace 1202 is 10 ms. right shifted.

Figure 13A:
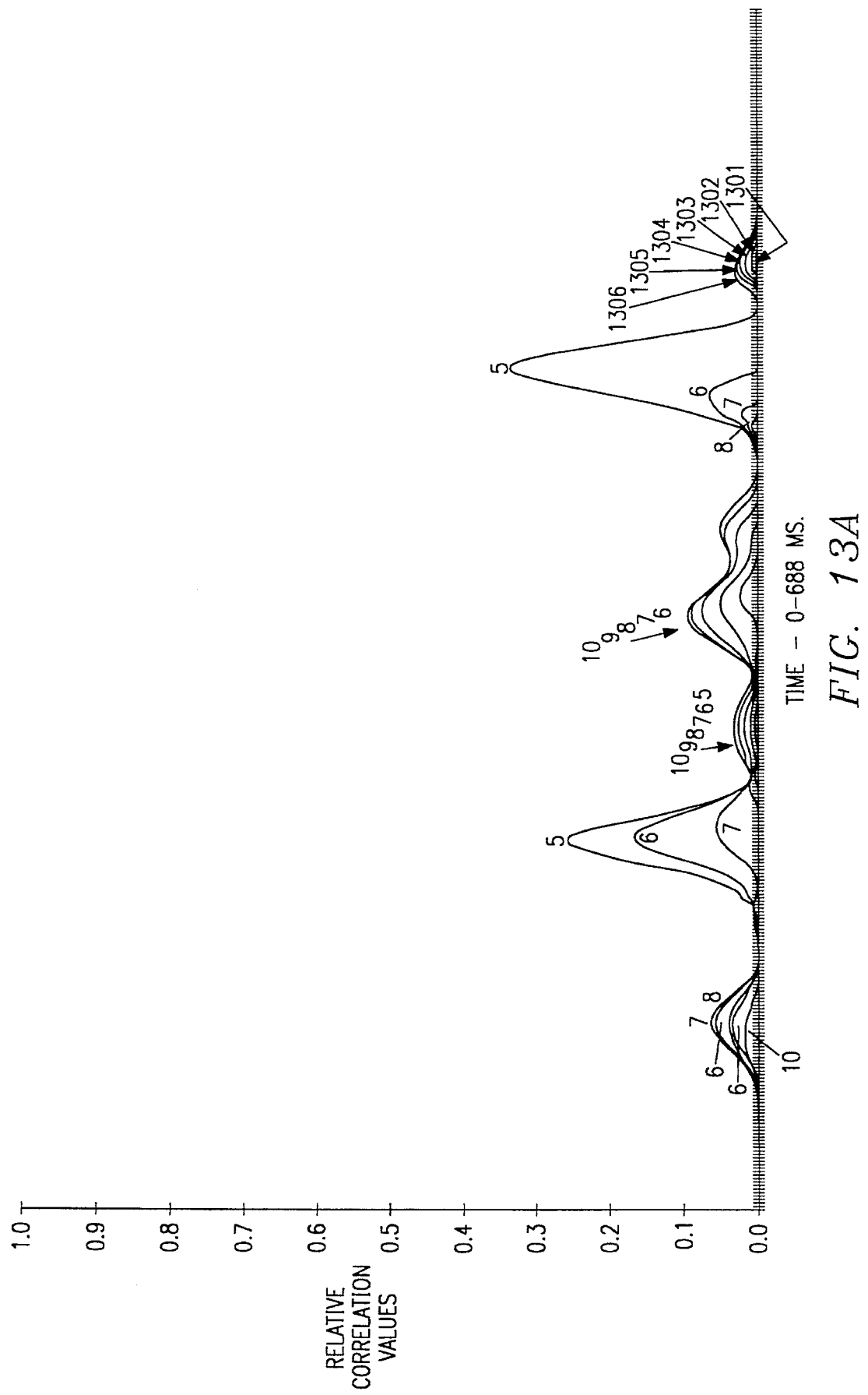
FIGS. 13A–13D are graphs showing filtered product traces used in a conformal mapping procedure used according to one embodiment of the invention.
Figure 13B:
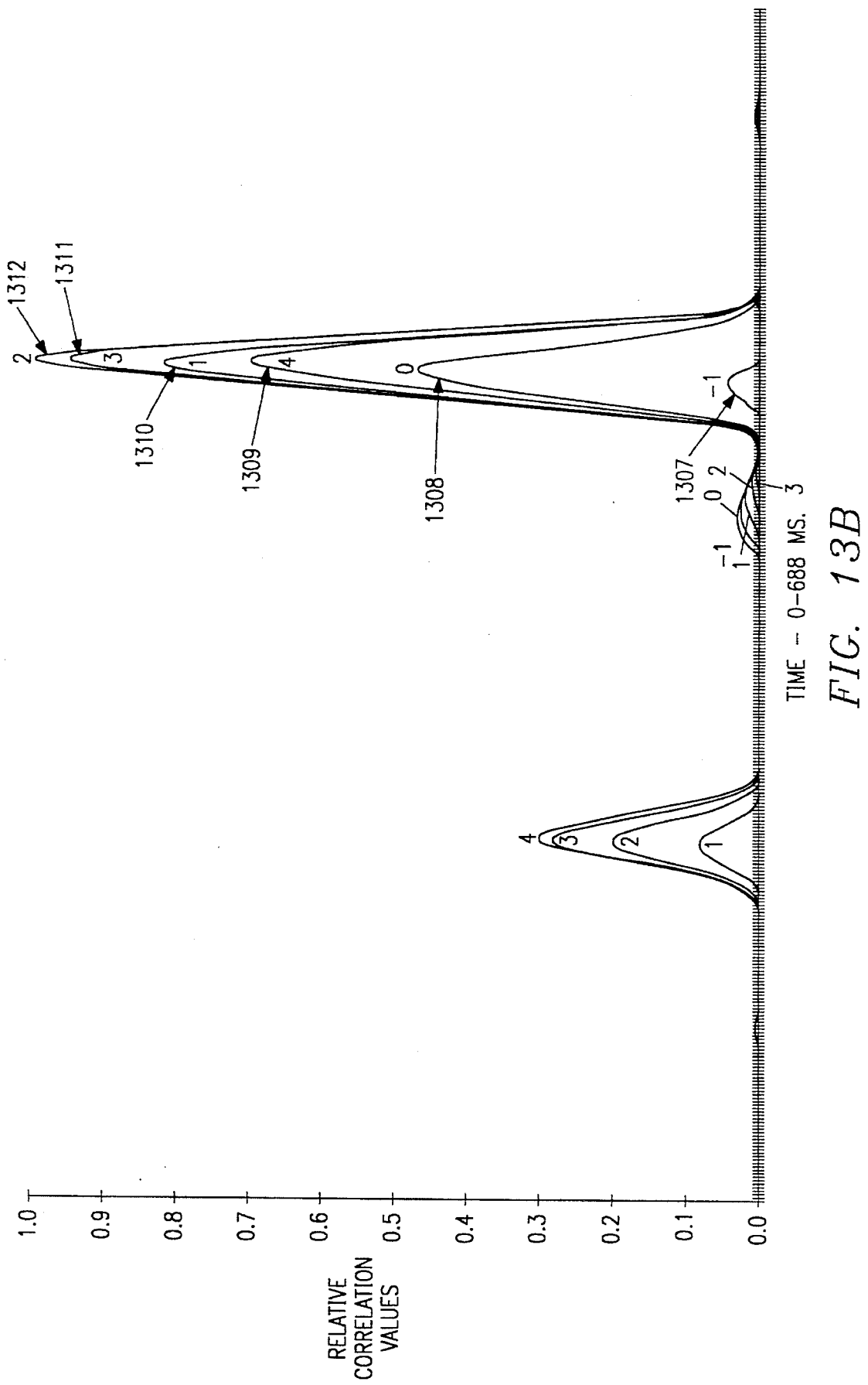
Figure 13C:
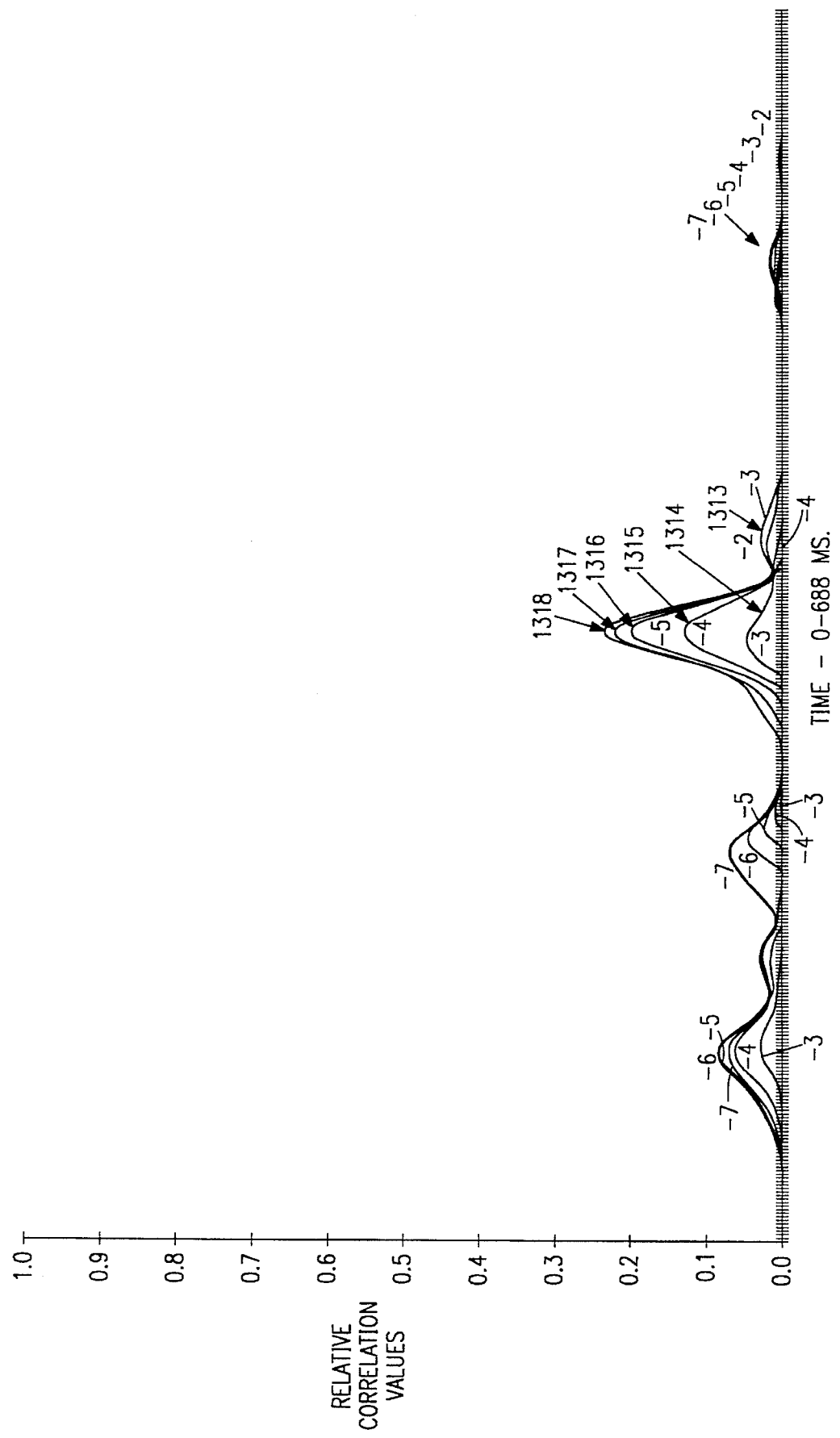
Figure 13D:
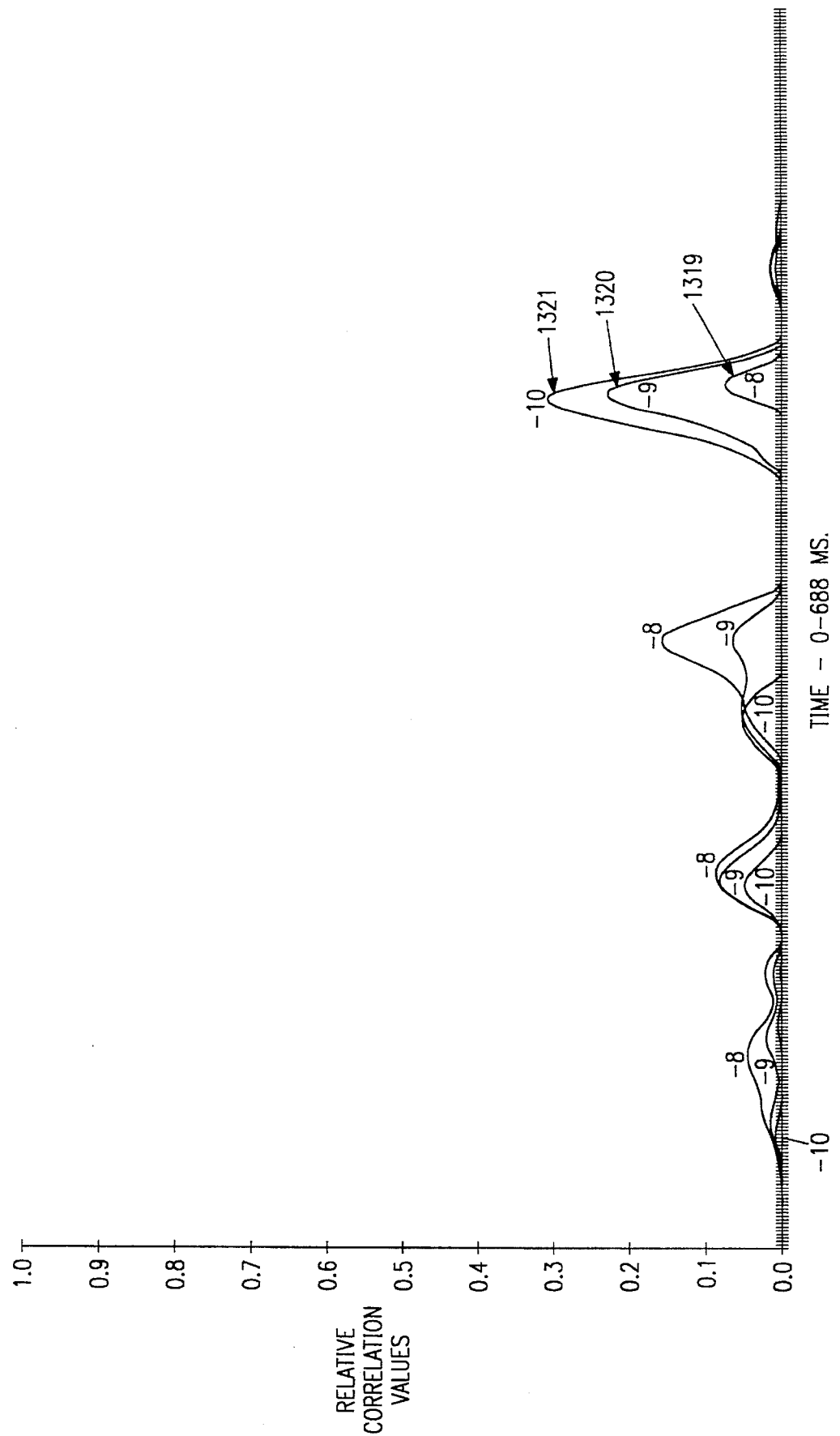

A set of 21 filtered product traces developed as described are shown in FIGS. 13A–13D. FIG. 13A shows filtered product traces 1301–1306 for shifts from 10 ms. to 5 ms., respectively. FIG. 13B shows filtered product traces from 4 ms. to −1 ms. (1307–1312 respectively). FIG. 13C shows filtered product traces 1313–1318 from −2 ms. to −7 ms., respectively. FIG. 13D shows filtered product traces 1319–1321 from −8 ms. to −10 ms., respectively. The manner in which the correct shift is indicated in the set of product traces 1301–1321 is described below.

Referring again to FIG. 12, during the shifting operation of trace 1202, one of complexes 1206b–1209b comes into register with a corresponding complex 1206a–1209a of trace 1201. At that shifted position, the product of those corresponding complexes will tend to have more positive values than negative, except for noise. The product will approach the square of one trace in form and amplitude as the noise shrinks to zero.

Not all wavelet complexes in any one shift will cause a maximum at the same time shift. Peaks in the filtered product traces 1301–1321 (FIGS. 13A–13D) are indications of which events in trace 1202 (FIG. 12) require how much shift to best align with trace 1201. Therefore, according to this example, the time axis of trace 1202 is remapped according to the observations from the filtered product traces 1301–1302. Thus, the remapped trace 1202 will have all wavelet complexes simultaneously aligned for accurate summing with the corresponding wavelet complexes of trace 1201. Such mapping of time axes is accomplished, according to one embodiment, in a seismic processing computer. According to yet a further embodiment, such mapping is vectorized for multi-processor computers, or, alternatively, vector-functioned-chained for computers with array processors.

Advantages of the above process in lieu of hyperbolic moveout correction between traces having large differences in offset include performing small residual time corrections, thus considerably improving preservation of high frequencies. A further advantage is the performing of residual static corrections that may vary some with recording time, or on data that has only a few good reflectors.

Various static programs use cross-correlations to determine the average time step-out between pairs of traces which either have a common shot into adjacent geophone stations, or vice versa. This process is unacceptable when data quality is poor, or when only a few good reflections exist with a large amount of noise. The above-described embodiment, therefore, has the further advantage of allowing the processor to key only on the measurements at times of good reflection wavelet complexes, thus not degrading the cross-correlation by the noise that exists between wavelet complexes.

When heterogeneous localized velocities exist, but not at the surface, the "static" time shift they cause varies somewhat with record time. Thus, the "static" is really a mild "dynamic"; and, therefore, the above-described embodiment has the further advantage of allowing measurement and correction of that phenomena, which is not a part of conventional common depth point practice.

Note that because the primary reflections are aligned, addition of the traces suppresses the multiple reflections. Thus, according to the above described embodiment of the invention, synchronization is performed across a set of traces having a limited offset, retaining high frequencies, and the long offset trace alignment described above align the resulting traces across a large offset, thus reducing multiples. Accordingly, the high frequencies usually lost when synchronizing across a large offset are preserved, while the multiples suppressed by alignment on primary wavelet complexes is retained.

Signal To Noise Ratio Criticality

Those of skill in the art will recognize that before traces having common reflection points are added, it is traditional to perform what is known as velocity analysis and static error correction. It has been found that the signal-to-noise ratio of the traces compared in such analysis and error correction is critical to success and cost effectiveness of the analysis and error correction.

Velocity Correction For Moveout And Static Error

As is known by those of skill in the art, in traditional normal moveout correction ("NMO"), there is not one single hyperbolic function used for all reflections. This is due to the fact that the velocity of the seismic signals generally increases with depth.

As is also known in the art, the hyperbolic moveout curve presumes a flat surface, with each geophone at the same level, and with the velocity of propagation independent of offset at any given reflection time. One reason the events do not follow the hyperbolic moveout curve is because of the failure to meet these assumptions. This error occurs in every reflection for a given trace. Another error that occurs in every reflection of every trace is the sub-weathering static error, as is also known by those of skill in the art. Static errors are to be distinguished from the term "non-hyperbolic moveout" error which is reserved for those errors that are not constant for every reflection in the trace. One example of non-hyperbolic moveout error is the error introduced by anomalies, discussed in reference to FIG. 11, above.

Because velocity is affected by the static error, and because static error is affected by the change in velocity with depth, an iterative process is used to simultaneously converge on an estimate of velocity change with depth, and a static error correction. Accordingly, a first velocity analysis is conducted assuming no static error, then the static error is estimated (by the process described below). Then the traces are corrected for these estimated static errors, after which the velocity analysis is again conducted, followed by another pass at estimation of the static error. The two processes are alternately repeated until the marginal benefit of ever-reducing corrections is less than some predetermined amount.

Velocity Correction For Moveout

It will be remembered that for all traces having common mid-points, a "gather" may be graphed with the nearest offset traces (those whose source-receiver pairs have the least offset) are on the left, and the traces whose source-receiver pairs have the longest offset are on the right. To estimate the NMO correction, it will also be remembered that the hyperbolic moveout correction formula is used:

$$t_x^2 = t_o^2 + (x/v)^2$$

Where $t_o$ represents a time value presuming a source-receiver pair at the midpoint position (no offset), $x_1$ equals the actual offset between a source and receiver pair, and v represents the velocity of the seismic signal. Those of skill in the art also accept that there is a different v for each reflection event. To estimate v as a function of time $t_0$, an iterative process described below, is used.

First, it is assumed, for purposes of making normal moveout corrections, that the velocity at $t_0$ is slow, for example, 5,000 feet/sec. Next, a table of time corrections at densely spaced $t_0$ values for every offset (x) in the record is generated. The table has on one axis, $t_0$, and on another axis, x. For the first $t_0$, 0 seconds is presumed. $t_0$ is then incremented (for example, by 0.02 sec.), and the $t_x$ is again solved. For each $t_0$ and x, a $t_x$ is solved. Then a correction factor of $t_x$–$t_0$ is calculated for each given time and offset.

Next, the traces in the gather are corrected according to the entries in the table, and the corrected traces are added together. If v actually equaled (or was close to) 5,000 feet/sec. for a particular $t_x$, then some reflection event will be enhanced by the addition, while the rest will not, since the enhanced event has been time-aligned by the correction for 5000 feet/sec. The "envelope" of the added traces is saved in a separate graph having as axes, velocity and $t_0$.

Next, a new table is built assuming v=5,500 feet/sec. for $t_0$; $t_0$ is again incremented; and $t_x$ is solved for each $t_0$. Another envelope is calculated, and the new envelope is graphed on a v vs. $t_0$ graph.

The process continues until there are about 30 envelopes on the same graph. When finished, there will be some envelopes that show peaks at particular $t_0$ and v values, corresponding to reflection event, having those particular parameters. The peaks are presumed to represent correct values for $t_0$ and v, then from those peaks, an estimated equation for v as a function of $t_0$ is made.

Next, a final table is generated, using the same formula, but the v parameter of the equation is replaced with the estimated function of $v(t_0)$. Now as $t_0$ increments, so does v, and then a new $t_x$ for a given $t_0$ is calculated. Therefore, the new correction factor $t_x$–$t_0$ can be calculated as v changes with $t_0$.

Static Errors

To find the static error, first, all the gathers along a traverse are moveout corrected, based on the first velocity analysis. Next, all the traces from one source element location into a first receiver are cross-correlated into all traces from the same source element location into a second receiver, wherein the second receiver is adjacent to the first receiver. The cross-correlation will show a positive maximum at a particular time shift. One trace is arbitrarily chosen as reference. Another trace, representing the same source element location into the second receiver, is compared to the trace from a third receiver, adjacent in position to the second. The third trace is then shifted in time and compared again to the second trace until there is a maximum correlation. Because there are multiple shots into any given pair of adjacent receivers, the process is repeated for every pair of adjacent receivers, once for each shot common to these adjacent receivers, to get an average for the maximum correlation time shift for the pair of receivers. That average maximum correlation time shift for that pair is recorded. Then the same process is repeated for the next two receivers. A table is generated mapping average maximum correlation time shifts to receiver pairs. The static time shifts in this table are the differences in the static shifts between adjacent receiver locations. To obtain the absolute values of shift for this static error, these differences must be integrated (cumulatively summed). However, structural data is included in the interpreted average maximum correlation time shifts, which must be preserved and not removed as a static error. Because it is generally accepted that structure does not change trace-to-trace as rapidly as does the true static error, a moving average of the interpreted average maximum correlation time shifts for adjacent traces is calculated. That moving average is presumed to be caused by structure. Accordingly, the moving average is subtracted from the integrated average maximum correlation time shifts. The result is the static correction for each receiver pair.

Presuming the first receiver station is the reference, each trace recorded into each receiver station is corrected by the static correction relative to the reference station.

The velocity correction is again conducted, using the traces that have been corrected for static errors, and then, the static correction is again conducted with the newer data. The velocity correction and static error processes are repeated until the marginal change in the correction factors is below a predetermined limit. The reaching of the predetermined limit is referred to as convergence.

Unfortunately, in the prior art, convergence did not always occur; or, if it did, convergence took many iterations, thus being a costly achievement.

Figure 14:
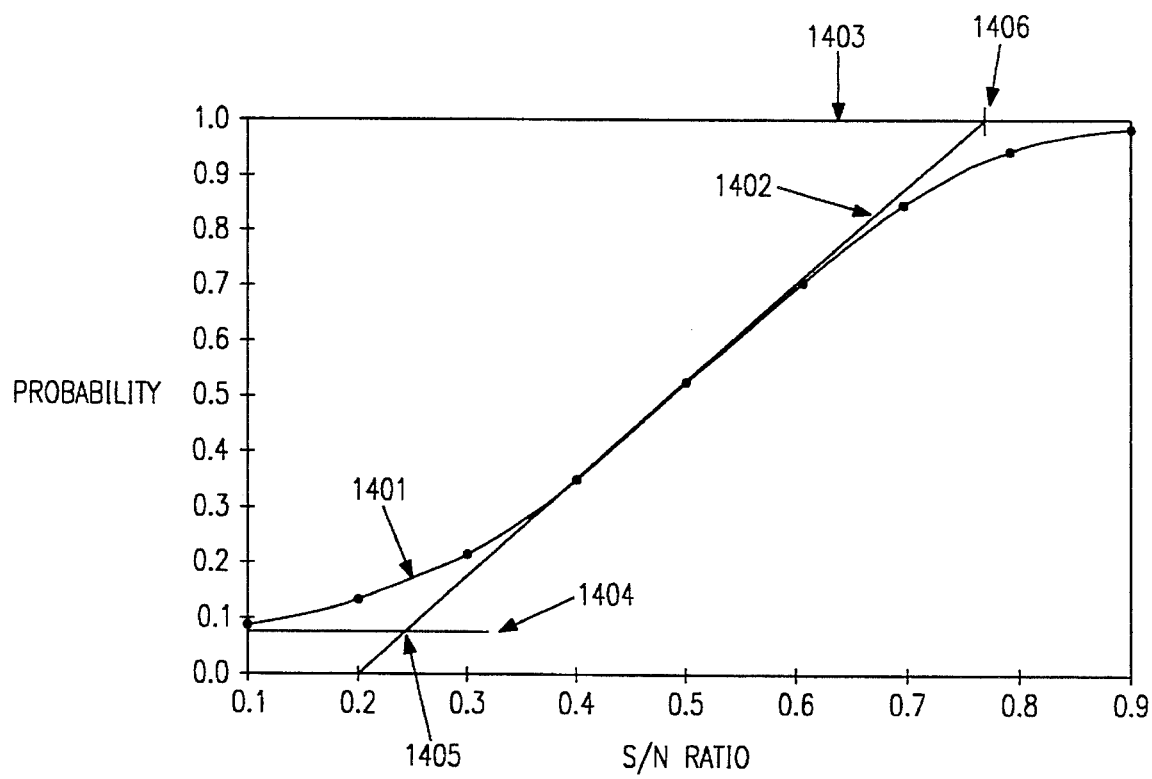
FIG. 14 is a graph illustrating the probability of reaching convergence in iterative velocity and static error correction processes, as a function of signal-to-noise ratio.

According to one embodiment of the invention, it has been found that the one reason for lack of convergence and large numbers of iterations to achieve convergence in the prior art is low signal-to-noise ratios in the traces used. According to this embodiment of the present invention, it has been found that the statistical probability of finding a correct positive maximum at a correct time shift in the first pass of static error correction is related to the signal-to-noise ratio by a non-linear function, seen graphed in FIG. 14 as line 1401. Points on line 1401 were obtained from 8000 individual experiments for each of several signal-to-noise ratios for two synthesized seismic traces. Each experiment used statistically different signal and noise components. The value at 0.2 S/N was estimated using values at other points. (Parameters: Trace window: 1 second; Spectrum: 30 Hz Ricker; Condition for correct pick: within ±1 sample). As can be seen from FIG. 14, the sign of the second derivative of the line 1401 changes at a signal-to-noise ratio of 0.5. Also seen in FIG. 14, if a line 1402 is drawn tangent to line 1401 at 0.5, and the tangent lines 1403 and 1404 are drawn at the points where the slope of the tangent to line 1401 goes to zero, two "break over" points 1405 and 1406 are seen at 0.25 and 0.75, respectively. It is believed that, in practice, convergence can be achieved if the signal-to-noise ratio is at 0.25 or above, provided enough estimates for each static time shift between adjacent receivers are available (~16 or more), and that convergence is substantially easier and cheaper to achieve at 0.5 and above, and that substantial benefits are still realizable at 0.75 and above. In practice it is also believed that while the higher the signal-to-noise ratio the better, ratios at 0.8 or above are preferred.

The above description is given by way of example only, and is not intended to limit the invention in any way. Those of skill in the art will recognize other embodiments of the present invention, for example, for marine exploration, that will not depart from the spirit of the invention.

What is claimed is:

1. A process for creating a seismic section from traces received from seismic signal receivers, the process comprising:

generating a first common reflection point gather of a first set of traces, wherein the first set of traces represent seismic signals originating from a first source point, the first source point comprising multiple source element locations;

synchronizing a plurality of the first set of traces within the first common reflection point gather;

adding the synchronized signals within the first common reflection point gather;

generating a second common reflection point gather of a second set of traces, wherein the second set of traces represent seismic signals originating from a second source point, the second source point comprising multiple source element locations;

synchronizing a plurality of the signals within the second common reflection point gather;

adding the synchronized signals within the second common reflection point gather;

wherein the first and the second source points are at least about as far apart as one-half the distance along the traverse covered by the receiver groups when receiving signals, and wherein the seismic signals received from the first and second source points are continuous samplings along the traverse from the same depth level.

2. A process as in claim 1 further comprising:

generating a third common reflection point gather of a third set of traces, wherein the third set of traces represent seismic signals originating from a third source point, the third source point comprising multiple source element locations;

synchronizing a plurality of the signals within the third common reflection point gather; and wherein the third source point is located between the first and second source points, and wherein the energy used at the third source point is less than the energy used at either the first or the second source points.

3. A process as in claim 1, wherein the adding the synchronized signals within the first common reflection point gather defines a first added signal and wherein the adding the synchronized signals within the second common reflection point gather defines a second added signal, and further comprising:

conformal mapping the first added signal to the second added signal, thereby defining a first mapped signal and a second mapped signal;

adding the first and second mapped signals.

4. A process as in claim 1, wherein each trace in the first set of traces is formed by adding together, without synchronization, signals received at a single receiver group from multiple source element locations in the first source point.

5. A process for creating high quality field records in seismic data gathering comprising:

a) generating a first seismic signal at a source point;

b) receiving reflections of the first seismic signal at a plurality of receivers, and receiving noise at the plurality of receivers while receiving the reflections of the first seismic signal, the reflections and the noise defining a first received signal;

c) recording the first received signal, thus defining a recorded signal;

d) generating a second seismic signal at a source point;

e) receiving reflections of the second seismic signal at a plurality of receivers, and receiving noise at the plurality of receivers while receiving the reflections of the second seismic signal, the reflections and the noise defining a second received signal;

f) adding the second received signal to the recorded signal, thus defining an added signal, the ratio of the amplitude of the reflections of the seismic signal in the added signal to the amplitude of the noise in the added signal defining a signal-to-noise ratio;

g) recording the added signal, to replace the recorded signal;

h) repeating steps d through f until the signal-to-noise ratio is 0.2 or greater.

6. A process as in claim 5 wherein steps a through e are repeated until the signal-to-noise ratio of the added signal is about 0.5 or greater.

7. A process as in claim 5 wherein steps a through e are repeated until the signal-to-noise ratio of the added signal is about 0.8 or greater.

8. A process as in claim 5 wherein steps a through e are repeated until the signal-to-noise ratio of the added signal is about 1 or greater.

9. A process as in claim 5 wherein the generating is accomplished with a vibrator.

10. A process as in claim 5 wherein the generating is accomplished with explosive.

11. A process for generating a seismic section from multiple traces recorded from seismic receivers along a traverse and reducing the degradation of high frequencies, the process comprising:

defining an offset limit for synchronization of traces having a common reflection point;

choosing at least two traces, the difference in offset between the two traces being about equal to or less than the offset limit;

synchronizing the at least two traces; and adding the at least two traces.

12. A process in claim 11, wherein the defining comprises:

a) choosing an offset limit;

b) synchronizing a first test set of traces in a first test common reflection point gather, wherein the common reflection points of the first test set of traces are below a first location along the traverse, thereby defining a first synchronized test set of traces;

c) adding the traces in the first synchronized test set of traces, thereby defining an added test trace;

d) determining the degradation amount of the maximum frequency of interest in the added test trace;

e) repeating steps a through d until the degradation amount of the maximum frequency of interest in the added test trace is less than the maximum degradation percentage.

13. A process as in claim 11 wherein the defining comprises:

a) choosing an offset limit b) synchronizing a first test set of traces in a first test common reflection point gather, wherein the common reflection points of the first test set of traces are below a first location along the traverse, thereby defining a first synchronized test set of traces;

c) adding the traces in the first synchronized test set of traces, thereby defining a first added test trace;

d) determining a first degradation amount of the maximum frequency of interest in the first added test trace;

e) synchronizing a second test set of traces in a second test common reflection point gather, wherein the common reflection points of the second test set of traces are below a second location along the traverse, thereby defining a second synchronized test set of traces;

f) adding the traces in the second synchronized test set of traces, thereby defining a second added test trace;

g) determining a second degradation amount of the maximum frequency of interest in the second added test trace;

h) repeating steps a through g until the average of the first and the second degradation amounts is less than the maximum degradation percentage.

14. A process as in claim 13 wherein the traces have a signal-to-noise ratio of about 0.2 or higher.

15. A process as in claim 13 wherein the traces have a signal-to-noise ratio of about 0.5 or higher.

16. A process as in claim 13 wherein the traces have a signal-to-noise ratio of about 0.8 or higher.

17. A process as in claim 13 wherein the traces have a signal to noise ratio of about 1 or higher.

18. A process for suppression of a predetermined wavelength L of horizontal noise in seismic data comprising:

choosing a first set of traces at a first set of receiver groups, the first set of receiver groups being spaced by m receiver group intervals, the receiver group interval having a length of about d, each of the first set of traces being from a first source cluster, the first source cluster being located at a first source point having k source clusters;

choosing a second set of traces at a second set of receiver groups, the second set of receiver groups being spaced by m receiver group intervals, the receiver group interval having a length of about d, each of the second set of traces being from a second source cluster, the second source cluster being located at the first source point;

grouping traces from the first and second sets of traces into a first set of gathers, wherein the midpoint between the source cluster and the receiver group for each trace in any gather is the same;

synchronizing each trace in a particular gather of the first set of gathers with every other trace in the particular gather, thus defining a synchronized set of traces;

repeating the synchronizing for each gather in the first set of gathers;

adding the synchronized traces, whereby a set of added traces is defined, one added trace for each of the first set of gathers;

defining an integer q equal to the greater of the receiver group length or the source cluster length, in units of receiver group intervals;

generating a set of running sum traces from the set of added traces with an n-trace running sum, according to the following relationships:

$n=(2m)/q$ and $(L/d)=2mk+(q/2)$.

19. A process as in claim 18, whereby the grouping reduces the degradation of a maximum frequency of interest below a maximum degradation percentage, the grouping comprising:

determining a maximum range of offset for synchronization of traces having a common reflection point whereby, upon addition of the traces after synchronization, the maximum frequency of interest is degraded by a degradation amount about equal to or less than the maximum degradation percentage; and choosing a first set of traces, the difference in offset between any two traces in the first set of traces being about equal to or less than the maximum range of offset.

20. A process in claim 19, wherein the determining comprises:

a) choosing an offset value for the maximum range of offset;

b) synchronizing a first test set of traces in a first test common reflection point gather, wherein the common reflection points of the first test set of traces are below a first location along the traverse, thereby defining a first synchronized test set of traces;

c) adding the traces in the first synchronized test set of traces, thereby defining an added test trace;

d) determining the degradation amount of the maximum frequency of interest in the added test trace;

e) repeating steps a through d until the degradation amount of the maximum frequency of interest in the added test trace is less than the maximum degradation percentage.

21. A process as in claim 20 wherein the traces have a signal-to-noise ratio of about 0.2 or higher.

22. A process as in claim 20 wherein the traces have a signal-to-noise ratio of about 0.5 or higher.

23. A process as in claim 20 wherein the traces have a signal-to-noise ratio of about 0.8 or higher.

24. A process as in claim 20 wherein the traces have a signal to noise ratio of about 1 or higher.

25. A process as in claim 19 wherein the determining comprises:

a) choosing an offset value for the maximum range of offset;

b) synchronizing a first test set of traces in a first test common reflection point gather, wherein the common reflection points of the first test set of traces are below a first location along the traverse, thereby defining a first synchronized test set of traces;

c) adding the traces in the first synchronized test set of traces, thereby defining a first added test trace;

d) determining a first degradation amount of the maximum frequency of interest in the first added test trace;

e) synchronizing a second test set of traces in a second test common reflection point gather, wherein the common reflection points of the second test set of traces are below a second location along the traverse, thereby defining a second synchronized test set of traces;

f) adding the traces in the second synchronized test set of traces, thereby defining a second added test trace;

g) determining a second degradation amount of the maximum frequency of interest in the second added test trace;

h) repeating steps a through g until the average of the first and the second degradation amounts is less than the maximum degradation percentage.

26. A process as in claim 25 wherein the traces have a signal-to-noise ratio of about 0.2 or higher.

27. A process as in claim 25 wherein the traces have a signal-to-noise ratio of about 0.5 or higher.

28. A process as in claim 25 wherein the traces have a signal-to-noise ratio of about 0.8 or higher.

29. A process as in claim 25 wherein the traces have a signal to noise ratio of about 1 or higher.

30. A process for conformal mapping comprising:

a) defining a reference trace;

b) defining a shift amount;

c) defining a sample interval, the sample interval being less than the shift amount, whereby an integer n is defined as the ratio of the shift amount to the shift interval;

d) shifting a second trace in time n times, whereby a set of n shifted traces are defined;

e) multiplying a plurality of the set of shifted traces by either the reference trace or the second trace, whereby a set of product traces are defined;

f) setting a plurality of the negative portions in a plurality of the set of product traces about zero, whereby a set of zero-corrected product traces is defined;

g) filtering a plurality of the set of zero-corrected product traces with a filter having a shape similar to the envelope of the wavelet that generated either the reference trace, whereby a filtered set of product traces is defined;

h) remapping the second trace such that each wavelet complex of the second trace is time shifted by the amount of shift of the product trace from the set of product traces that includes the maximum response for that wavelet complex.

31. A process as in claim 30, wherein the shift amount is about equal to more than one half the period of the average wavelet of the reference trace.

32. A process as in claim 31, wherein the shift amount is about 20 ms.

33. A process as in claim 32, wherein the shift occurs between about −10 ms and about −20 ms.

34. A process as in claim 30, wherein the sample interval is about 1 ms.

35. A process as in claim 34, wherein the shift amount is less than the period of the wavelets of the reference trace.

36. A process as in claim 35, wherein the shift amount is about 20 ms.

37. A process as in claim 36, wherein the shift occurs between about −10 ms and about −20 ms.

38. A process for seismic data gathering comprising:

collecting a first set of multiple signals from a first set of ray paths, wherein the first set of ray paths originate from a first source point and are received at a first receiver point;

organizing a plurality of the first set of multiple signals into a first set of clusters, wherein the furthest spaced traces of a first specific cluster of the first set of multiple clusters are spaced no greater than a distance at which a predetermined $f_{max}$ is attenuated less than a predetermined factor K upon addition of the furthest spaced traces in the first specific cluster;

collecting a second set of multiple signals from a second set of ray paths, wherein the second set of ray paths originate from a second source point and are received at a second receiver point;

organizing a plurality of the second set of multiple signals into a second set of clusters, wherein the furthest spaced traces of a second specific cluster of the second set of multiple clusters are spaced no greater than a distance at which a predetermined $f_{max}$ is attenuated less than a predetermined factor K upon addition of the furthest spaced traces in the second specific cluster;

adding together a plurality of the signals within the same cluster to create a cluster signal for each of a plurality of the clusters;

sorting a plurality of the cluster signals into common reflection point gathers, wherein each cluster signal within any common reflection point gather has a reflection point in common with every other cluster signal in each common reflection point gather;

synchronizing a plurality of the cluster signals within a plurality of the common reflection point gathers.

39. A process as in claim 38 further comprising implementing the Anstey stack array for suppression of horizontal noise.

40. A process as in claim 38 wherein said synchronizing comprises normal moveout correction.

41. A process as in claim 38 wherein said synchronizing comprises conformal mapping.

42. A process as in claim 41 wherein said conformal mapping comprises:

a) defining a reference trace;

b) defining a shift amount;

c) defining a sample interval, the sample interval being less than the shift amount, whereby an integer n is defined as the ratio of the shift amount to the shift interval;

d) shifting a second trace in time n times, whereby a set of n shifted traces are defined;

e) multiplying a plurality of the set of shifted traces by either the reference trace or the second trace, whereby a set of product traces are defined;

f) setting a plurality of the negative portions in a plurality of the set of product traces about zero, whereby a set of zero-corrected product traces is defined;

g) filtering a plurality of the set of zero-corrected product traces with a filter having a shape similar to the envelope of the wavelet that generated either the reference trace, whereby a filtered set of product traces is defined;

h) remapping the second trace such that each wavelet complex of the second trace is time shifted by the amount of shift of the product trace from the set of product traces that includes the maximum response for that wavelet complex.

43. A process for creating a seismic section from traces received from seismic signal receivers, the process comprising:

generating a first common reflection point gather of a first set of traces, wherein the first set of traces represent seismic signals originating from a first source point, the first source point comprising multiple source element locations spaced each from the other by a distance x which is less than or equal to the spacing distance at which addition of any two of the first set of traces results in an attenuation of a predetermined maximum frequency of interest $f_{max}$ by a predetermined attenuation factor K;

synchronizing a plurality of the first set of traces within the first common reflection point gather;

adding the synchronized signals within the first common reflection point gather;

generating a second common reflection point gather of a second set of traces, wherein the second set of traces represent seismic signals originating from a second source point, the second source point comprising multiple source element locations spaced each from the other by a distance x which is less than or equal to the spacing distance at which addition of any two of the second set of traces results in an attenuation of a predetermined maximum frequency of interest $f_{max}$ by a predetermined attenuation factor K;

synchronizing a plurality of the signals within the second common reflection point gather;

adding the synchronized signals within the second common reflection point gather;

wherein the first and the second source points are about as far apart as one-half the distance along the traverse covered by the receiver groups when receiving signals, and wherein the seismic signals received from the first and second source points are continuous samplings along the traverse from the same depth level.

44. A process as in claim 43 further comprising implementing the Anstey stack array for suppression of horizontal noise.

45. A process as in claim 43 wherein said synchronizing comprises normal moveout correction.

46. A process as in claim 43 wherein said synchronizing comprises conformal mapping.

47. A process as in claim 46 wherein said conformal mapping comprises:

a) defining a reference trace;

b) defining a shift amount;

c) defining a sample interval, the sample interval being less than the shift amount, whereby an integer n is defined as the ratio of the shift amount to the shift interval;

d) shifting a second trace in time n times, whereby a set of n shifted traces are defined;

e) multiplying a plurality of the set of shifted traces by either the reference trace or the second trace, whereby a set of product traces are defined;

f) setting a plurality of the negative portions in a plurality of the set of product traces about zero, whereby a set of zero-corrected product traces is defined;

g) filtering a plurality of the set of zero-corrected product traces with a filter having a shape similar to the envelope of the wavelet that generated either the reference trace, whereby a filtered set of product traces is defined;

h) remapping the second trace such that each wavelet complex of the second trace is time shifted by the amount of shift of the product trace from the set of product traces that includes the maximum response for that wavelet complex.

* * * * *